US012683452B2

(12) United States Patent 
Suizu et al.

(10) Patent No.: US 12,683,452 B2 
(45) Date of Patent: Jul. 14, 2026

(54) VIBRATION GENERATING DEVICE

(71) Applicant: ALPS ALPINE CO., LTD., Tokyo (JP)

(72) Inventors: Takayuki Suizu, Miyagi (JP); Masaaki Mikawa, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 236 days.

(21) Appl. No.: 18/776,743

(22) Filed: Jul. 18, 2024

(65) Prior Publication Data

US 2025/0038610 A1      Jan. 30, 2025

(30) Foreign Application Priority Data

Jul. 24, 2023     (JP) ................................. 2023-119971

(51) Int. Cl.
  *H02K 5/02*          (2006.01)
  *H02K 33/02*         (2006.01)
(52) U.S. Cl.
  CPC ............... *H02K 5/02* (2013.01); *H02K 33/02* (2013.01)
(58) Field of Classification Search
  CPC ................................. H02K 33/02; H02K 5/02
  USPC ..................................................... 310/15, 81
  See application file for complete search history.

(56) References Cited

U.S. PATENT DOCUMENTS

| | | | |
|---|---|---|---|
| 2008/0089168 A1* | 4/2008 | Higuchi ................. | B06B 1/045 |
| | | | 366/116 |
| 2017/0012514 A1 | 1/2017 | Xu et al. | |
| 2021/0067021 A1* | 3/2021 | Maeda ................... | H02K 33/16 |
| 2022/0302813 A1* | 9/2022 | Maeda ................... | H02K 33/02 |
| 2023/0100549 A1* | 3/2023 | Kubo ..................... | B06B 1/045 |
| | | | 310/81 |

FOREIGN PATENT DOCUMENTS

| | | |
|---|---|---|
| JP | 2017-022964 | 1/2017 |

* cited by examiner

*Primary Examiner* — Jose A Gonzalez Quinones
(74) *Attorney, Agent, or Firm* — IPUSA, PLLC

(57)          ABSTRACT

A vibration generating device includes a movable body in a housing, supported to vibrate along a first direction; a bracket attached to the housing, including a body plate extending in a second direction and a first reinforcing plate extending in a third direction from one end of the body plate in the second direction; a coil attached to the body plate, including main-bundle-wire-parts in the second direction connected by a sub-bundle-wire-part; and a magnet attached to the movable body on another side of the coil in the third direction, generating a magnetic flux toward the main-bundle-wire-part. One end of the magnet in the second direction is inside one end of the sub-bundle-wire-part in the second direction. The first reinforcing plate extends from inside one end of the sub-bundle-wire-part in the second direction and outside one end of the magnet in the second direction, toward another side in the third direction.

6 Claims, 16 Drawing Sheets

VIBRATION GENERATING DEVICE

CROSS-REFERENCE TO RELATED APPLICATION

The present application is based on and claims priority under 35 U.S.C. § 119 to Japanese Patent Application No. 2023-119971, filed on Jul. 24, 2023, the contents of which are incorporated herein by reference in their entirety.

BACKGROUND OF THE INVENTION

1. Field of the Invention

The present invention relates to a vibration generating device.

2. Description of the Related Art

Conventionally, a vibration motor (vibration generating device) for generating vibration has been known (see Patent Document 1). The vibration motor includes a fixing member including a coil supported by a coil frame fixed to a main housing via an L-shaped support part (reinforcing part), and a vibration member including a magnetic steel set.

[Patent Document 1] Japanese Unexamined Patent Application Publication No. 2017-022964

SUMMARY OF THE INVENTION

According to one aspect of the present invention, there is provided a vibration generating device including a housing;

a movable body accommodated in the housing;

a support member configured to support the movable body so as to be able to vibrate along a first direction;

a bracket including a body plate part extending in a second direction perpendicular to the first direction and a reinforcing part including a first reinforcing plate part extending in a third direction perpendicular to the first direction and the second direction via a first bent part from one end of the body plate part in the second direction, the bracket being attached to the housing via an attachment plate part;

a coil including a main bundle wire part including a plurality of conductive wires extending in the second direction and a sub-bundle wire part connecting two of the main bundle wire parts that are adjacent to each other, the coil being attached to one side of the body plate part in the third direction; and a permanent magnet configured to generate a magnetic flux directed toward the main bundle wire part, the permanent magnet being attached to the movable body on another side of the coil in the third direction, wherein one end of the permanent magnet in the second direction is positioned inside relative to one end of the sub-bundle wire part in the second direction, and the first reinforcing plate part extends from a position that is inside relative to one end of the sub-bundle wire part in the second direction and outside relative to one end of the permanent magnet in the second direction, toward another side in the third direction.

DETAILED DESCRIPTION OF THE EMBODIMENTS

The support part in the conventional technology described above is arranged outside the coil so as to protrude from the outline of the coil in top view. Therefore, the vibration motor is made so as to be large enough to accommodate the support part.

Therefore, it is desirable to provide a vibration generating device which is easy to be downsized.

Figure 1:
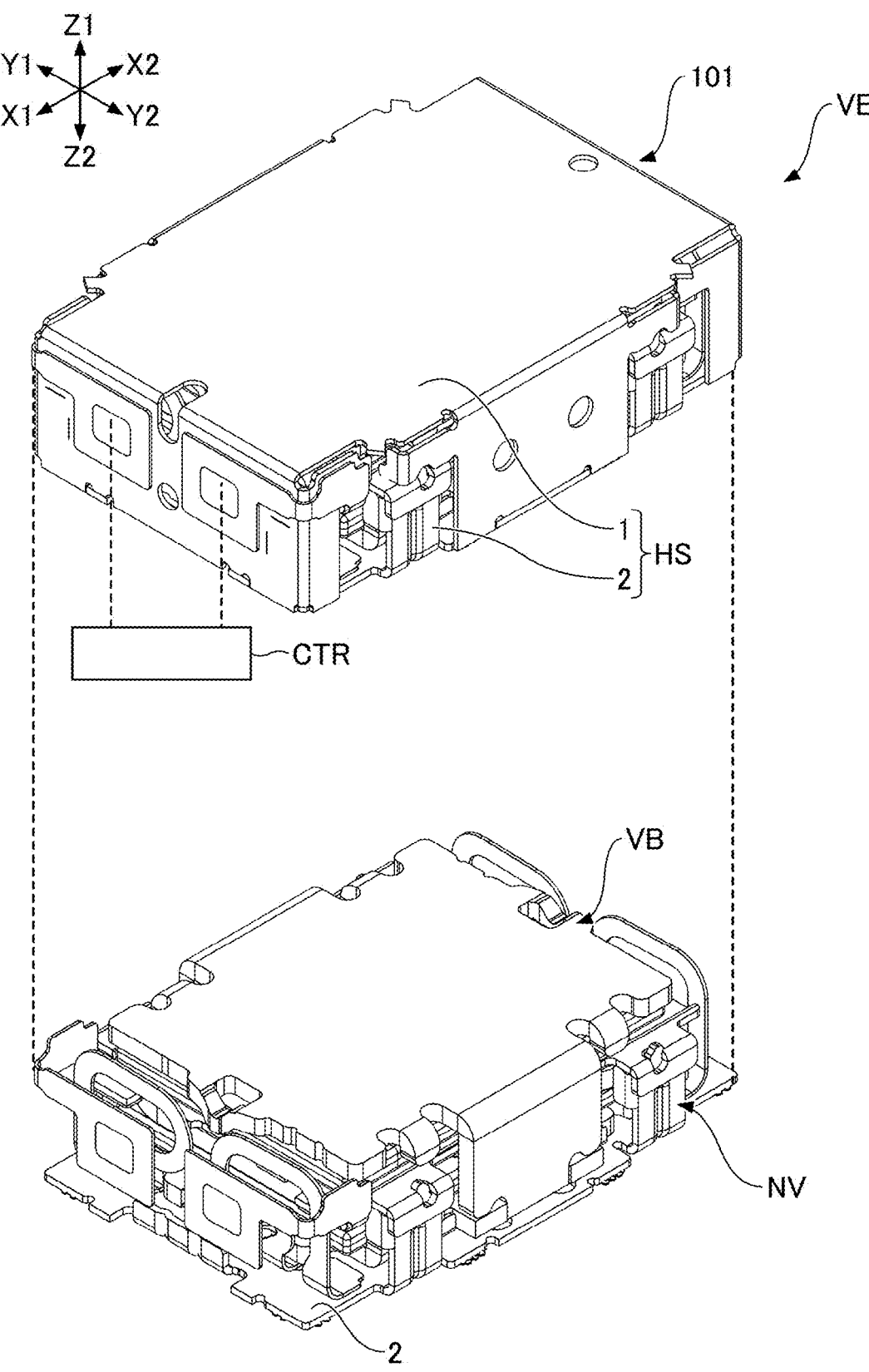
FIG. 1 is a perspective view of a vibration generating device.
Figure 2:
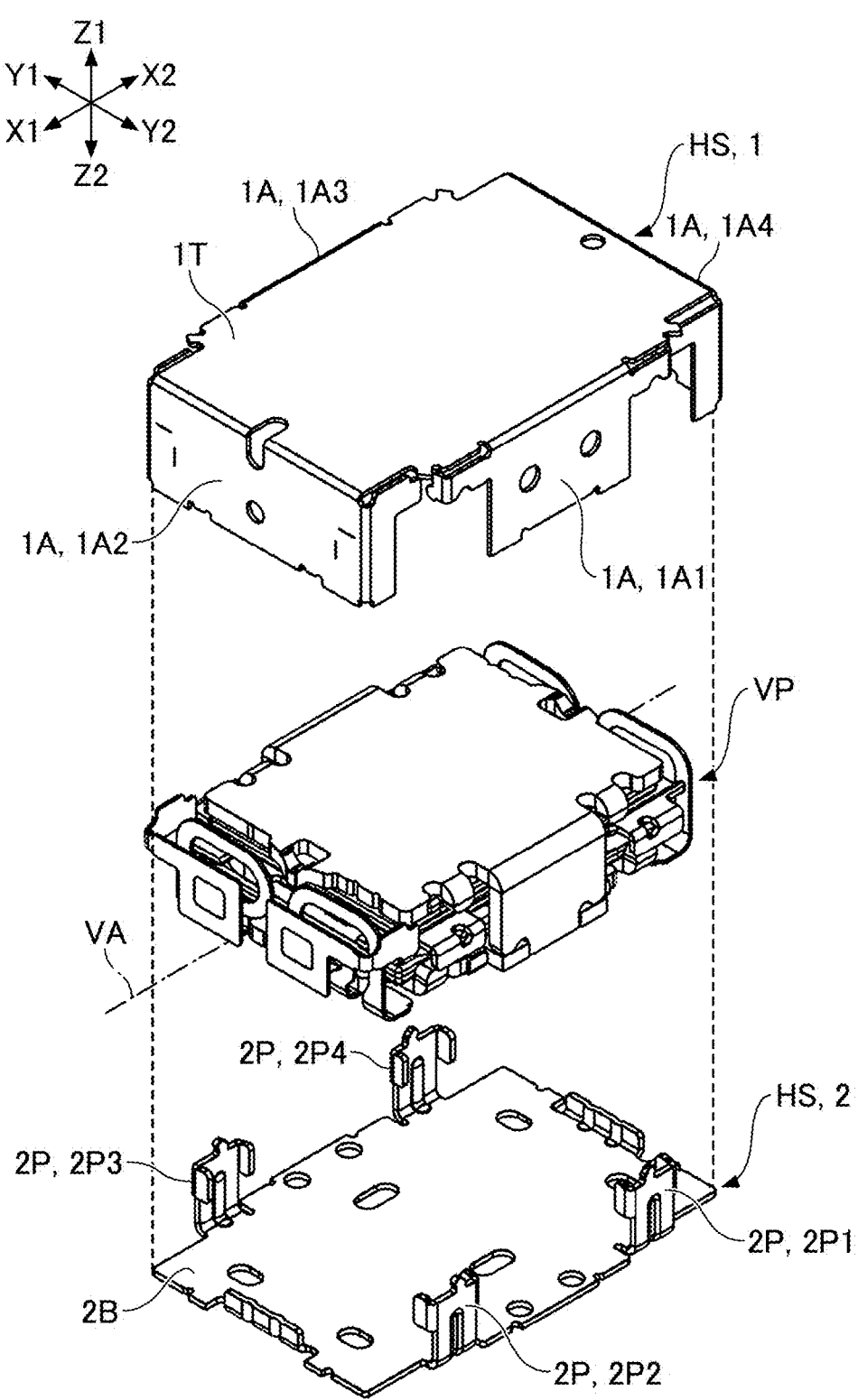
FIG. 2 is an exploded perspective view of a vibration generating device.

Hereinafter, a vibration device VE including a vibration generating device 101 according to an embodiment of the present disclosure will be described with reference to the drawings. FIG. 1 is a perspective view of the vibration device VE including the vibration generating device 101 and a control unit CTR. Specifically, the upper diagram in FIG. 1 is a perspective view of the vibration generating device 101 connected to the control unit CTR, and the lower diagram in FIG. 1 is a perspective view of the vibration generating device 101 with a cover member 1 removed. FIG. 2 is an exploded perspective view of the vibration generating device 101.

In FIGS. 1 and 2, X1 represents one direction of the X axis constituting a three-dimensional rectangular coordinate system, and X2 represents the other direction of the X axis. Y1 represents one direction of the Y axis constituting the three-dimensional rectangular coordinate system, and Y2 represents the other direction of the Y axis. Similarly, Z1 represents one direction of the Z axis constituting the three-dimensional rectangular coordinate system, and Z2 represents the other direction of the Z axis. In the present embodiment, the X1 side of the vibration generating device 101 corresponds to the front side (front face) of the vibration generating device 101, and the X2 side of the vibration generating device 101 corresponds to the rear side (back face) of the vibration generating device 101. The Y1 side of the vibration generating device 101 corresponds to the left side of the vibration generating device 101, and the Y2 side of the vibration generating device 101 corresponds to the right side of the vibration generating device 101. The Z1 side of the vibration generating device 101 corresponds to the upper side of the vibration generating device 101, and the Z2 side of the vibration generating device 101 corresponds to the lower side of the vibration generating device 101. The same applies to other drawings.

The vibration device VE includes the control unit CTR and the vibration generating device 101. The vibration generating device 101 has a housing HS and a vibration part VP accommodated in the housing HS.

The housing HS has a substantially rectangular parallelepiped shape as illustrated in FIG. 1. In the present embodiment, the housing HS is formed of a nonmagnetic material such as austenitic stainless steel. The housing HS includes the cover member 1 and a base member 2.

As illustrated in FIG. 2, the cover member 1 is configured to form a side surface and an upper surface of the housing HS, and the base member 2 is configured to form a bottom surface of the housing HS. In the illustrated example, the base member 2 is configured to function as a base supporting the vibration part VP.

In the illustrated example, the cover member 1 has a substantially rectangular cylindrical outer peripheral wall part 1A, and a flat plate-shaped top plate part 1T provided to be continuous with an upper end (end on the Z1 side) of the outer peripheral wall part 1A.

The outer peripheral wall part 1A includes four side plate parts formed in a flat plate shape. Specifically, as illustrated in FIG. 2, the outer peripheral wall part 1A includes a first side plate part 1A1 and a third side plate part 1A3 facing each other, and a second side plate part 1A2 and a fourth side plate part 1A4 facing each other and perpendicular to the first side plate part 1A1 and the third side plate part 1A3.

The control unit CTR is configured to implement the movement of the vibration part VP. In the illustrated example, the control unit CTR includes an electronic circuit and is configured to supply an alternating current for vibrating the vibration part VP to the vibration part VP. In the illustrated example, the control unit CTR is installed outside the housing HS, but may be installed inside the housing HS. In this case, the control unit CTR may be one of the components of the vibration generating device 101.

The vibration part VP is configured to vibrate the housing HS by vibrating itself. In the illustrated example, the vibration part VP is mounted in the housing HS to vibrate the housing HS.

Figure 3:
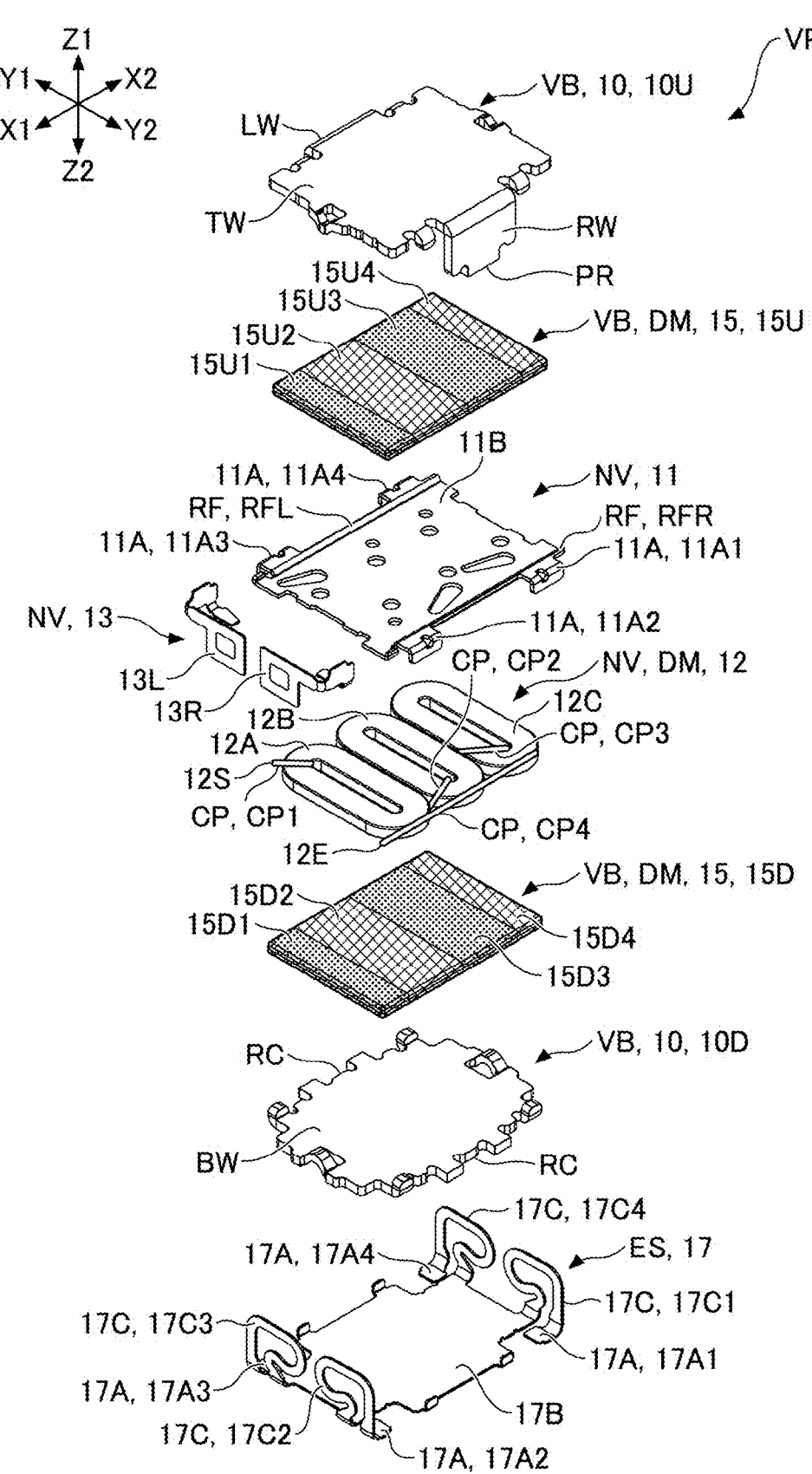
FIG. 3 is an exploded perspective view of a vibration part and a non-vibration body.

Next, the details of the vibration part VP will be described with reference to FIG. 3. FIG. 3 is an exploded perspective view of the vibration part VP. The vibration part VP includes a vibration body VB, a driving means DM, and an elastic support member ES.

The vibration body VB as a movable body has a predetermined natural frequency and is configured to vibrate with respect to the housing HS along a vibration axis VA (see FIG. 2) extending in a predetermined direction. In the illustrated example, the vibration body VB has a predetermined natural frequency and is configured to vibrate with respect to the base member 2 along a vibration axis VA (see FIG. 2) extending in the X axis direction (front-rear direction).

The driving means DM is an example of a vibrating force generating unit and is configured to vibrate the vibration body VB along the vibration axis VA. In the illustrated example, the driving means DM can vibrate, along the vibration axis VA, the vibration body VB elastically supported by the elastic support member ES, in response to an alternating current supplied through the control unit CTR.

The elastic support member ES is an example of a support member and is interposed between the housing HS and the vibration body VB to elastically support the vibration body VB.

Specifically, the vibration part VP including the vibration body VB, the driving means DM, and the elastic support member ES is composed of a yoke 10, a bracket 11, a coil 12, a wiring board 13, a magnet 15, and a plate spring 17. The vibration body VB is composed of the yoke 10 and the magnet 15, the driving means DM is composed of the coil 12 and the magnet 15, and the elastic support member ES is composed of the plate spring 17. The bracket 11, the coil 12, and the wiring board 13 constitute a non-vibration body NV that does not vibrate together with the vibration body VB. The non-vibration body NV vibrates together with the housing HS, but does not vibrate together with the vibration body VB.

The yoke 10 is a member constituting a magnetic circuit. In the embodiment, the yoke 10 is formed of a magnetic material containing iron or the like. In the illustrated example, the yoke 10 is composed of two members, an upper yoke 10U and a lower yoke 10D, and is formed of a cold rolled steel plate (SPCC). The upper yoke 10U is a member constituting the upper surface of the vibration body VB, and includes a left plate LW, a right plate RW, and a top plate TW. Specifically, a protruding part PR is formed on the Z2 side end surfaces of the left plate LW and the right plate RW so as to be engaged with a recessed part RC formed in the lower yoke 10D. The lower yoke 10D is a member constituting the lower surface of the vibration body VB, and includes a bottom plate BW. Specifically, a recessed part RC is formed on the Y1 side (left side) end surface and the Y2 side (right side) end surface of the lower yoke 10D so as to be engaged with a protruding part PR formed in the upper yoke 10U.

The bracket 11 is an example of a conductive member, and is configured so as to be able to support the coil 12 in a state where the coil 12 is opposed to the magnet 15 in a non-contact manner. That is, the bracket 11 is configured so as to function as a coil holder for supporting the coil 12. The bracket 11 is fixed to the base member 2 so as not to be in contact with the vibration body VB. In the present embodiment, the bracket 11 is a plate-like member made of a nonmagnetic material such as copper, aluminum, or an alloy thereof, and has the attachment plate part 11A and a body plate part 11B. Specifically, the bracket 11 is fixed to the base member 2 by fastening members, welding, bonding, caulking, or the like, through four attachment plate parts 11A protruding outward from the body plate part 11B at a position where the bracket 11 and the coil 12 do not contact the vibration body VB even when the vibration body VB vibrates. That is, the bracket 11 to which the coil 12 is mounted is configured not to vibrate together with the vibration body VB.

The coil 12 is configured so that a magnetic field can be generated by receiving an electric current. In the example illustrated in FIG. 3, the coil 12 includes three coil winding parts (a first coil winding part 12A, a second coil winding part 12B, and a third coil winding part 12C) connected in series. Each of the first coil winding part 12A, the second coil winding part 12B, and the third coil winding part 12C has a substantially elliptical shape (rounded rectangle) having a major axis along the Y axis direction. The coil 12 has a first end part 12S on the winding start side and a second end part 12E on the winding end side. The coil 12 is fixed to the Z2 side (lower side) surface of the bracket 11 by an adhesive or the like. The surface of a conductive wire (a wire formed of copper, copper alloy, or the like) constituting the coil 12 is coated with an insulating coating. In FIG. 3, the coil 12 is illustrated in a simplified state for the sake of clarity, and the detailed winding state is omitted. The same applies to other figures.

Figure 4:
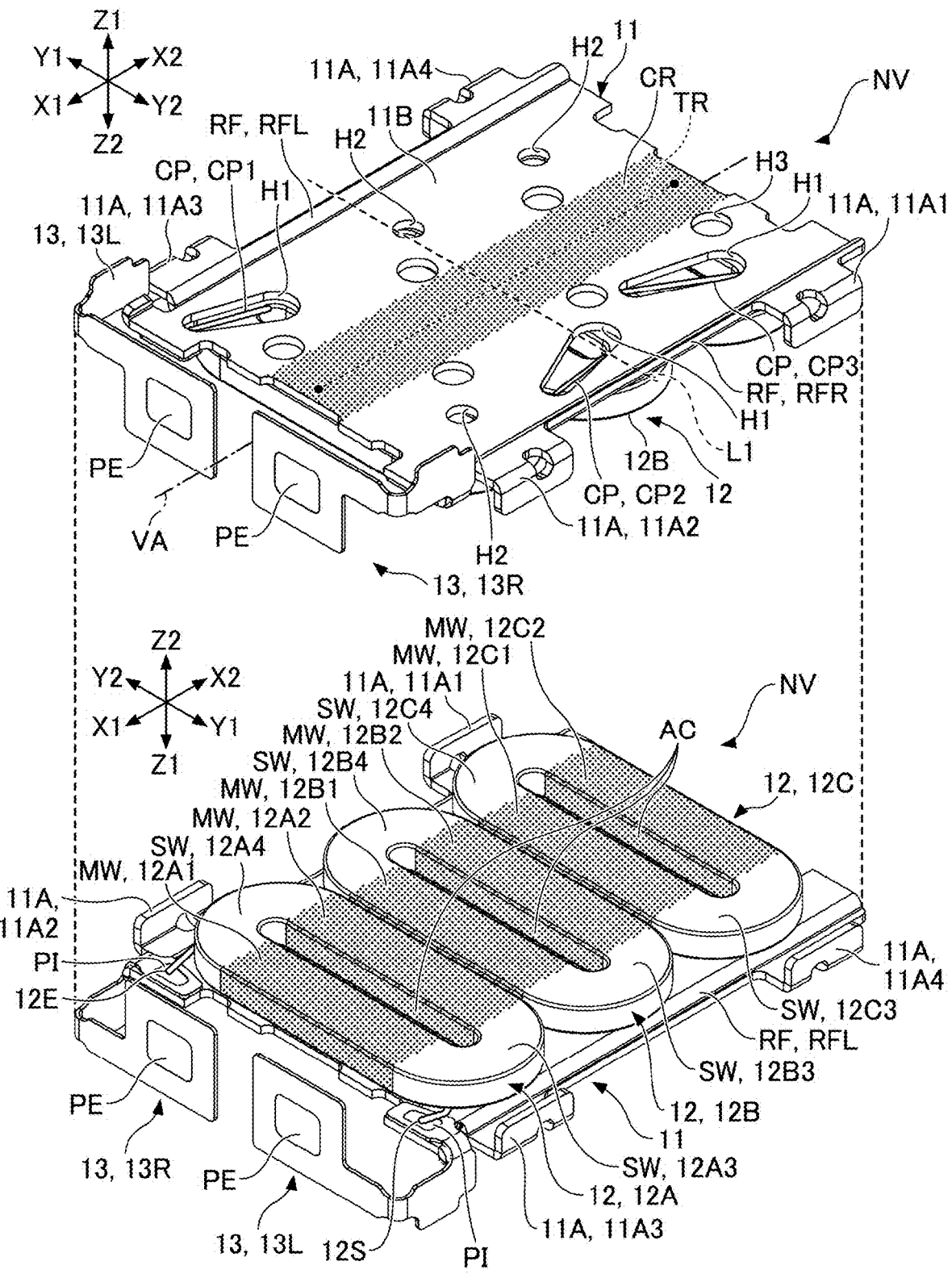
FIG. 4 is a perspective view of a non-vibration body.

The wiring board 13 is a member to which the first end part 12S and the second end part 12E of the coil 12 are connected. In the illustrated example, the wiring board 13 is fixed to the Z2 side (lower side) surface of the bracket 11 with an adhesive, as illustrated in the lower diagram of FIG. 4. FIG. 4 is a perspective view of the non-vibration body NV. Specifically, the upper diagram of FIG. 4 is an upper perspective view of the non-vibration body NV, and the lower diagram of FIG. 4 is a lower perspective view of the non-vibration body NV.

In the illustrated example, the wiring board 13 is a flexible wiring board and includes a left wiring board 13L and a right wiring board 13R. The left wiring board 13L and the right wiring board 13R are fixed to the X1 side (front side) end of the bracket 11 by an adhesive or the like. As illustrated in the lower diagram of FIG. 4, the first end part 12S of the coil 12 is connected to an inner conductor pattern PI of the right wiring board 13R by solder, a conductive adhesive, or the like, and the second end part 12E of the coil 12 is connected to the inner conductor pattern PI of the left wiring board 13L by solder, a conductive adhesive, or the like. An outer conductor pattern PE of the left wiring board 13L and the right wiring board 13R is connected to the conductive wire from the control unit CTR by solder, a conductive adhesive, or the like.

Each of the first coil winding part 12A, the second coil winding part 12B, and the third coil winding part 12C has an air core part AC. The first end part 12S, the first coil winding part 12A, the second coil winding part 12B, the third coil winding part 12C, and the second end part 12E are connected by a conductive wire part CP. Specifically, as illustrated in FIG. 3, the conductive wire part CP includes a first conductive wire part CP1 to a fourth conductive wire part CP4. The first end part 12S and the first coil winding part 12A are connected by the first conductive wire part CP1, the first coil winding part 12A and the second coil winding part 12B are connected by the second conductive wire part CP2, the second coil winding part 12B and the third coil winding part 12C are connected by the third conductive wire part CP3, and the third coil winding part 12C and the second end part 12E are connected by the fourth conductive wire part CP4.

Further, as illustrated in the lower diagram of FIG. 4, the coil 12 includes a main bundle wire part MW extending along the Y axis direction and a sub-bundle wire part SW connecting two adjacent main bundle wire parts MW. In the illustrated example, the main bundle wire part MW includes a plurality of conductive wires having a rectangular shape in the top view and extending in the Y axis direction (left-right direction), and the sub-bundle wire part SW includes a plurality of conductive wires having a substantially semicircular shape in the top view and extending concentrically. Specifically, the first coil winding part 12A has a front main bundle wire part 12A1, a rear main bundle wire part 12A2, a left sub-bundle wire part 12A3, and a right sub-bundle wire part 12A4, the second coil winding part 12B has a front main bundle wire part 12B1, a rear main bundle wire part 12B2, a left sub-bundle wire part 12B3, and a right sub-bundle wire part 12B4, and the third coil winding part 12C has a front main bundle wire part 12C1, a rear main bundle wire part 12C2, a left sub-bundle wire part 12C3, and a right sub-bundle wire part 12C4. The main bundle wire part MW includes a front main bundle wire part 12A1, a rear main bundle wire part 12A2, a front main bundle wire part 12B1, a rear main bundle wire part 12B2, a front main bundle wire part 12C1, and a rear main bundle wire part 12C2. The sub-bundle wire part SW includes a left sub-bundle wire part 12A3, a right sub-bundle wire part 12A4, a left sub-bundle wire part 12B3, a right sub-bundle wire part 12B4, a left sub-bundle wire part 12C3, and a right sub-bundle wire part 12C4. In the lower diagram of FIG. 4, a dot pattern is applied to the main bundle wire part MW of the coil 12 for clarity.

The magnet 15 is an example of a magnetic flux generating member and constitutes the driving means DM together with the coil 12. In the illustrated example, the magnet 15 includes an upper magnet 15U and a lower magnet 15D as illustrated in FIG. 3. Each of the upper magnet 15U and the lower magnet 15D is an 8 pole magnetized permanent magnet having a substantially rectangular parallelepiped outline. Specifically, the upper magnet 15U includes a first upper magnet part 15U1 to a fourth upper magnet part 15U4, and the lower magnet 15D includes a first lower magnet part 15D1 to a fourth lower magnet part 15D4. Each of the first upper magnet part 15U1 to the fourth upper magnet part 15U4 and the first lower magnet part 15D1 to the fourth lower magnet part 15D4 includes one N pole part and one S pole part. In the illustrated example, the upper surfaces of the first upper magnet part 15U1, the third upper magnet part 15U3, the first lower magnet part 15D1, and the third lower magnet part 15D3 are N poles, and the upper surfaces of the second upper magnet part 15U2, the fourth upper magnet part 15U4, the second lower magnet part 15D2, and the fourth lower magnet part 15D4 are S poles. In FIG. 3, for clarity, a dot pattern is applied to the N pole and a cross pattern is applied to the S pole of the 8 pole magnetized permanent magnet. The same applies to other figures. Each of the upper magnet 15U and the lower magnet 15D may be a combination of four 2 pole magnetized permanent magnets or a combination of two 4 pole magnetized permanent magnets.

The plate spring 17 is an example of an elastic support member ES interposed between the housing HS and the vibration body VB so as to elastically support the vibration body VB. In the present embodiment, the plate spring 17 is formed of a non-magnetic material such as austenitic stainless steel, and has a connecting part 17A, a vibration body support part 17B, and an elastic arm part 17C as illustrated in FIG. 3.

Figure 5:
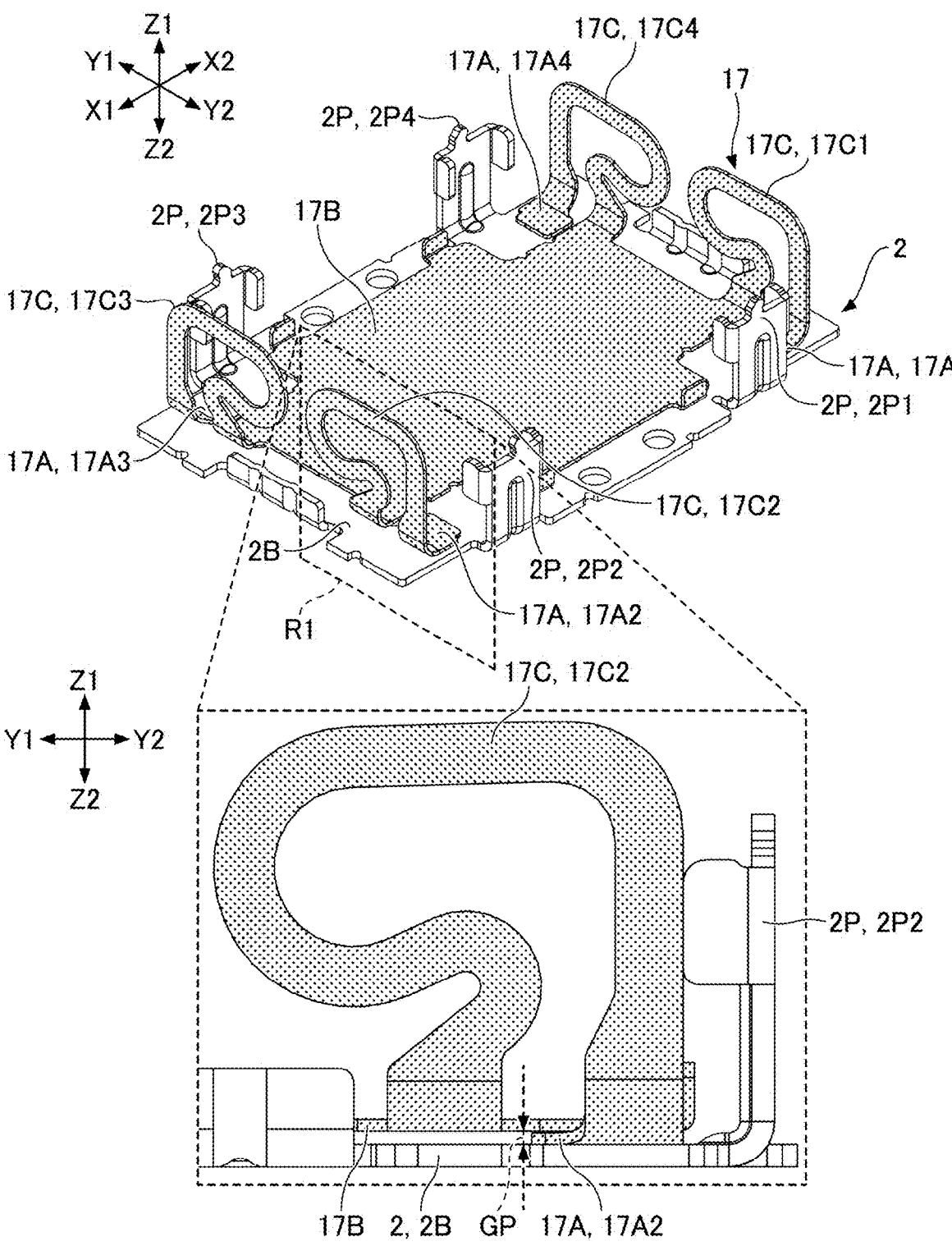
FIG. 5 illustrates an example configuration of a base member and an elastic support member.

Specifically, the plate spring 17 is formed, for example, by punching and bending a metal plate made of austenitic stainless steel having a thickness of 0.2 mm. More specifically, as illustrated in FIG. 5, the connecting part 17A of the plate spring 17 is welded to the bottom plate part 2B of the base member 2. The plate spring 17 is attached to the base member 2 through only the connecting part 17A in a state where a gap GP is formed between the bottom plate part 2B of the base member 2 and the vibration body support part 17B so that the vibration body support part 17B and the elastic arm part 17C do not contact the base member 2.

FIG. 5 is a diagram illustrating a configuration example of the base member 2 and the elastic support member ES (the plate spring 17). Specifically, the upper diagram in FIG. 5 is a perspective view of the base member 2 to which the elastic support member ES (the plate spring 17) is attached. The lower diagram in FIG. 5 is a front view of the base member 2 to which the elastic support member ES (the plate spring 17) is attached, and corresponds to an enlarged view of the area R1 surrounded by broken lines in the upper diagram in FIG. 5. In FIG. 5, a dot pattern is applied to the elastic support member ES (the plate spring 17) for clarity.

In the present embodiment, as illustrated in the upper diagram in FIG. 5, the connecting part 17A of the plate spring 17 includes a first connecting part 17A1 to a fourth connecting part 17A4, and the elastic arm part 17C of the plate spring 17 includes a first elastic arm part 17C1 to a fourth elastic arm part 17C4.

Figure 6:
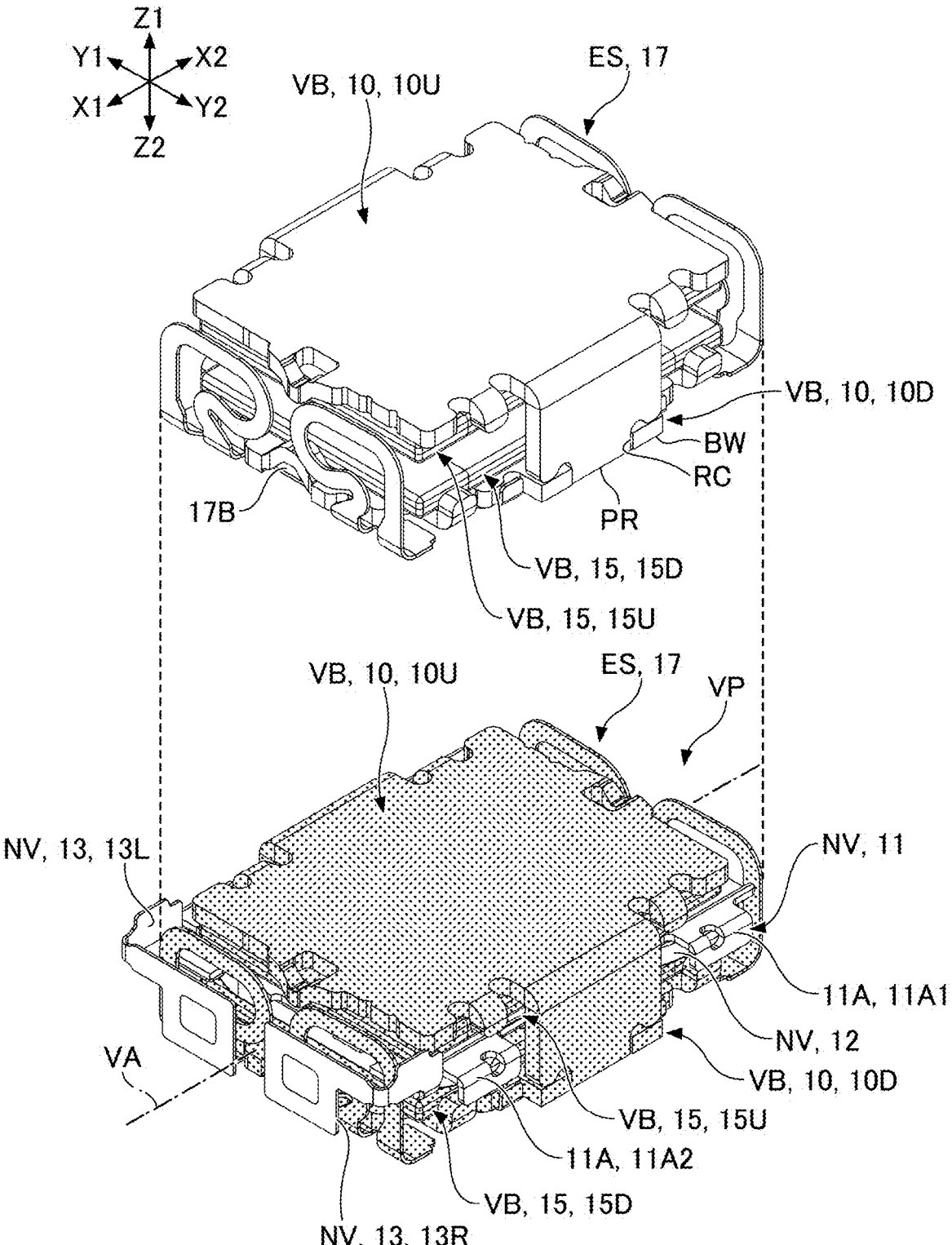
FIG. 6 is a perspective view of a vibration part and a non-vibration body.

As illustrated in the upper diagram in FIG. 5, each of the first connecting part 17A1 to the fourth connecting part 17A4 is fixed to the bottom plate part 2B of the base member 2 by welding. As illustrated in FIG. 6, a vibration body VB is welded to the vibration body support part 17B of the plate spring 17. FIG. 6 is a perspective view of the vibration part VP. Specifically, the upper diagram of FIG. 6 is a perspective view of the vibration part VP (elastic support member ES and vibration body VB) in a state where the non-vibration body NV (the bracket 11, the coil 12, and the wiring board 13) is not illustrated, and the lower diagram of FIG. 6 is a perspective view of the vibration part VP in a state where the non-vibration body NV is illustrated. In the lower diagram of FIG. 6, a dot pattern is applied to the vibration part (vibration body VB and elastic support member ES) for clarity. The presence or absence of a dot pattern indicates that the non-vibration body NV without dot patterns is fixed to the base member 2 (not illustrated in the lower diagram of FIG. 6) so as not to contact the vibration body VB with dot patterns. The lower diagram of FIG. 1 illustrates the non-vibration body NV fixed to the base member 2 so as not to contact the vibration body VB.

Specifically, as illustrated in the upper diagram of FIG. 6, the vibration body VB is composed of an upper yoke 10U, an upper magnet 15U, a lower magnet 15D, and a lower yoke 10D. The Z2 side (lower side) surface of the bottom plate part BW of the lower yoke 10D is welded to the Z1 side (upper side) surface of the vibration body support part 17B of the plate spring 17.

In the state illustrated in the lower diagram of FIG. 6, when an alternating current is applied to the coil 12 through the wiring board 13, the vibration body VB vibrates along the vibration axis VA.

Figure 7:
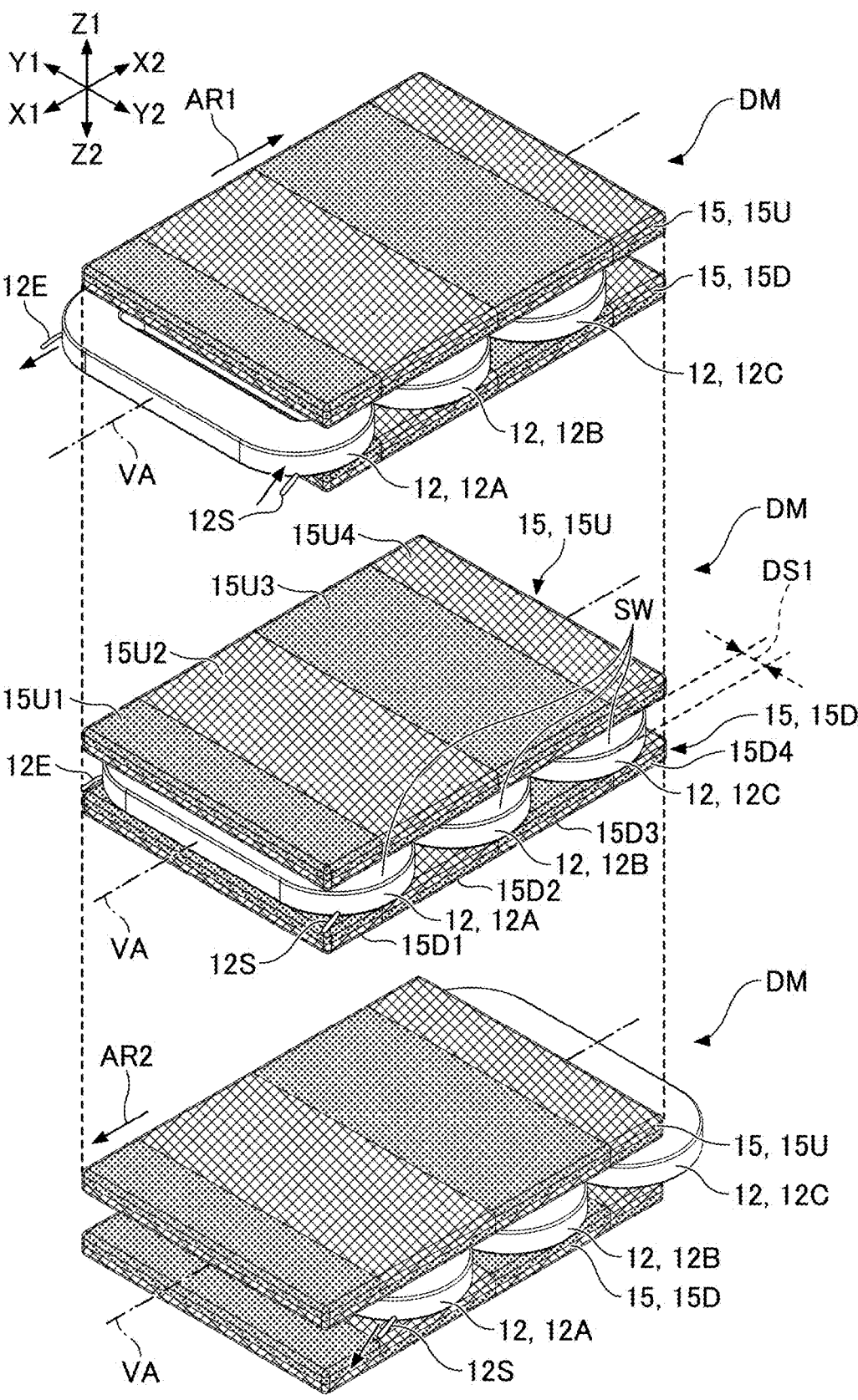
FIG. 7 is a perspective view of the driving means.

Now, with reference to FIG. 7, the positional relationship of the components of the driving means DM when the vibration body VB vibrates along the vibration axis VA will be described. FIG. 7 is a perspective view of the components of the driving means DM. Specifically, the upper diagram of FIG. 7 illustrates the positional relationship between the non-vibration body NV (the coil 12) and the vibration body VB (the magnet 15) when the vibration body VB (the magnet 15) moves to the most X2 side (the rear side) due to the current flowing in one direction of the coil 12. The center diagram of FIG. 7 illustrates the positional relationship between the non-vibration body NV (the coil 12) and the vibration body VB (the magnet 15) when no current flows in the coil 12. The lower diagram of FIG. 7 illustrates positional relationship between the non-vibration body NV (the coil 12) and the vibration body VB (the magnet 15) when the vibration body VB (the magnet 15) moves to the most X1 side (front side) due to the current flowing in the other direction of the coil 12.

When no current flows in the coil 12, neither repulsion nor attraction occurs between the coil 12 and the magnet 15 because the coil 12 does not generate a magnetic field. Therefore, as illustrated in the center diagram of FIG. 7, the magnet 15 is positioned in a neutral position so that the center thereof faces the center of the coil 12 (the second coil winding part 12B). Specifically, the vibration body VB (the magnet 15) located at a position other than the neutral position is urged to return to the neutral position by the elastic support member ES (the plate spring 17).

When a current flows from the first end part 12S of the coil 12 toward the second end part 12E, the first coil winding part 12A generates a magnetic field so that the Z1 side becomes the N pole and the Z2 side becomes the S pole, the second coil winding part 12B generates a magnetic field so that the Z2 side becomes the N pole and the Z1 side becomes the S pole, and the third coil winding part 12C generates a magnetic field so that the Z1 side becomes the N pole and the Z2 side becomes the S pole. As a result, the N pole part of the second upper magnet part 15U2 is moved away from the first coil winding part 12A and attracted to the second coil winding part 12B, the S pole part of the third upper magnet part 15U3 is moved away from the second coil winding part 12B and attracted to the third coil winding part 12C, the S pole part of the second lower magnet part 15D2 is moved away from the first coil winding part 12A and attracted to the second coil winding part 12B, and the N pole part of the third lower magnet part 15D3 is moved away from the second coil winding part 12B and attracted to the third coil winding part 12C, whereby the vibration body VB (the magnet 15) moves to the X2 side (rear side) as indicated by arrow AR1 in the upper diagram of FIG. 7.

Conversely, when a current flows from the second end part 12E of the coil 12 toward the first end part 12S, the first coil winding part 12A generates a magnetic field so that the Z1 side becomes the S pole and the Z2 side becomes the N pole, the second coil winding part 12B generates a magnetic field so that the Z2 side becomes the S pole and the Z1 side becomes the N pole, and the third coil winding part 12C generates a magnetic field so that the Z1 side becomes the S pole and the Z2 side becomes the N pole. As a result, the N pole part of the second upper magnet part 15U2 is moved away from the second coil winding part 12B and attracted to the first coil winding part 12A, the S pole part of the third upper magnet part 15U3 is moved away from the third coil winding part 12C and attracted to the second coil winding part 12B, the S pole part of the second lower magnet part 15D2 is moved away from the second coil winding part 12B and attracted to the first coil winding part 12A, and the N pole part of the third lower magnet part 15D3 is moved away from the third coil winding part 12C and attracted to the second coil winding part 12B, whereby the vibration body VB (the magnet 15) moves to the X1 side (front side) as indicated by arrow AR2 in the lower diagram of FIG. 7.

The control unit CTR can alternately reverse the direction of the magnetic field generated by the coil 12 by alternately reversing the direction of the current flowing through the coil 12, and consequently can vibrate the vibration body VB (the magnet 15) along the vibration axis VA (X axis direction).

Figure 8:
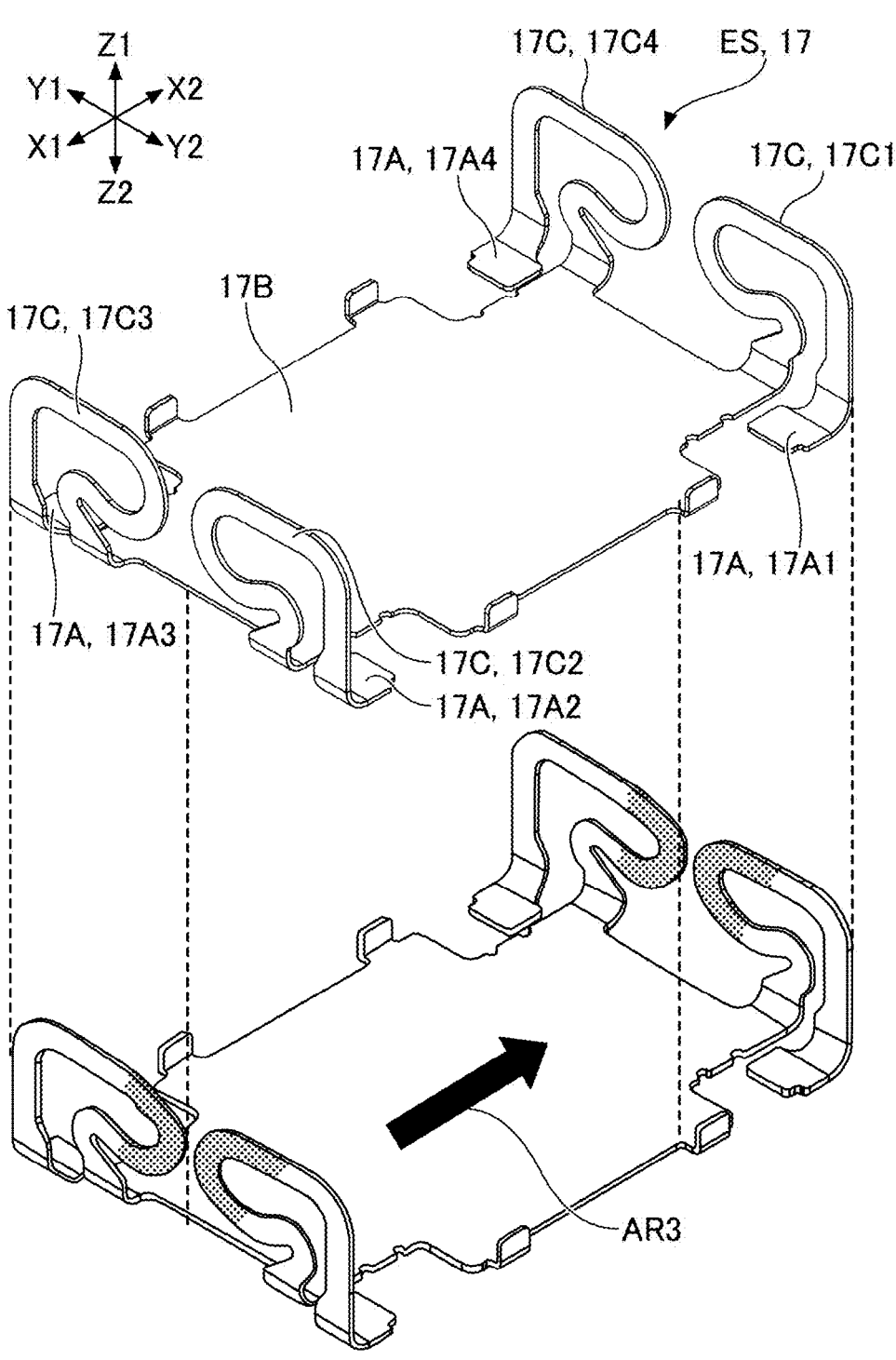
FIG. 8 is a perspective view of a plate spring.

Next, the movement of the elastic arm part 17C when the vibration body VB vibrates will be described with reference to FIG. 8. FIG. 8 is a perspective view of the plate spring 17. Specifically, the upper diagram of FIG. 8 illustrates the state of the plate spring 17 when no current flows through the coil 12, that is, when the vibration body VB is in the neutral position (not vibrating). The lower diagram of FIG. 8 illustrates the state of the plate spring 17 when the vibration body VB moves to the X2 side (rear side).

As illustrated in the upper diagram of FIG. 8, the elastic arm part 17C is provided between the connecting part 17A and the vibration body support part 17B. Specifically, the first elastic arm part 17C1 is provided between the first connecting part 17A1 and the vibration body support part 17B, the second elastic arm part 17C2 is provided between the second connecting part 17A2 and the vibration body support part 17B, the third elastic arm part 17C3 is provided between the third connecting part 17A3 and the vibration body support part 17B, and the fourth elastic arm part 17C4 is provided between the fourth connecting part 17A4 and the vibration body support part 17B.

When the vibration body VB (not illustrated in FIG. 8) is moved in the direction indicated by the arrow AR3 by the driving means DM, the elastic arm part 17C bends as illustrated in the lower diagram of FIG. 8, and the vibration body VB can be advanced in parallel in the X2 direction. In FIG. 8, for the sake of clarity, a dot pattern is applied at a part of the elastic arm part 17C where the bending is relatively large.

On the contrary, when the vibration body VB is moved in the direction (X1 direction) opposite to the direction (X2 direction) indicated by the arrow AR3 by the driving means DM, the elastic arm part 17C bends in the direction opposite to the bending direction illustrated in the lower diagram of FIG. 8, and the vibration body VB can be advanced in parallel in the X1 direction.

Now, referring again to FIG. 3, the details of the upper yoke 10U will be described. The upper yoke 10U has a top plate TW, a right plate RW, and a left plate LW. Specifically, a left plate LW extending in the Z2 direction is formed at the end of the top plate TW on the Y1 side, and a right plate RW extending in the Z2 direction is formed at the end of the top plate TW on the Y2 side. A protruding part PR is formed at the lower end of each of the left plate LW and the right plate RW so as to mesh with a recessed part RC formed in the lower yoke 10D. The upper diagram of FIG. 6 illustrates a state in which a recessed part RC formed in the lower yoke 10D is engaged with a protruding part PR of the upper yoke 10U.

When assembling the vibration body VB, an upper magnet 15U is attached to the top plate TW (see FIG. 3) of the upper yoke 10U, a lower magnet 15D is attached to the bottom plate BW (see FIG. 3) of the lower yoke 10D, and the protruding part PR of the upper yoke 10U is engaged with the recessed part RC of the lower yoke 10D. Thus, in the present embodiment, the upper yoke 10U and the lower yoke 10D surrounding the magnet 15 are formed as separate members so as to facilitate assembly of the vibration body VB.

As illustrated in the upper diagram of FIG. 6, the Z1 side (upper) surface of the upper magnet 15U is joined to the Z2 side (lower) surface of the top plate TW of the upper yoke 10U by magnetic force, and the Z2 side (lower) surface of the lower magnet 15D is joined to the Z1 side (upper) surface of the bottom plate BW of the lower yoke 10D by magnetic force. In the space surrounded by the upper yoke 10U and the lower yoke 10D, as illustrated in the lower diagram of FIG. 6, a coil 12 fixed to the bracket 11 is installed on the Z2 side relative to the upper magnet 15U and on the Z1 side relative to the lower magnet 15D in a state of non-contact with the upper magnet 15U and the lower magnet 15D.

Figure 9:
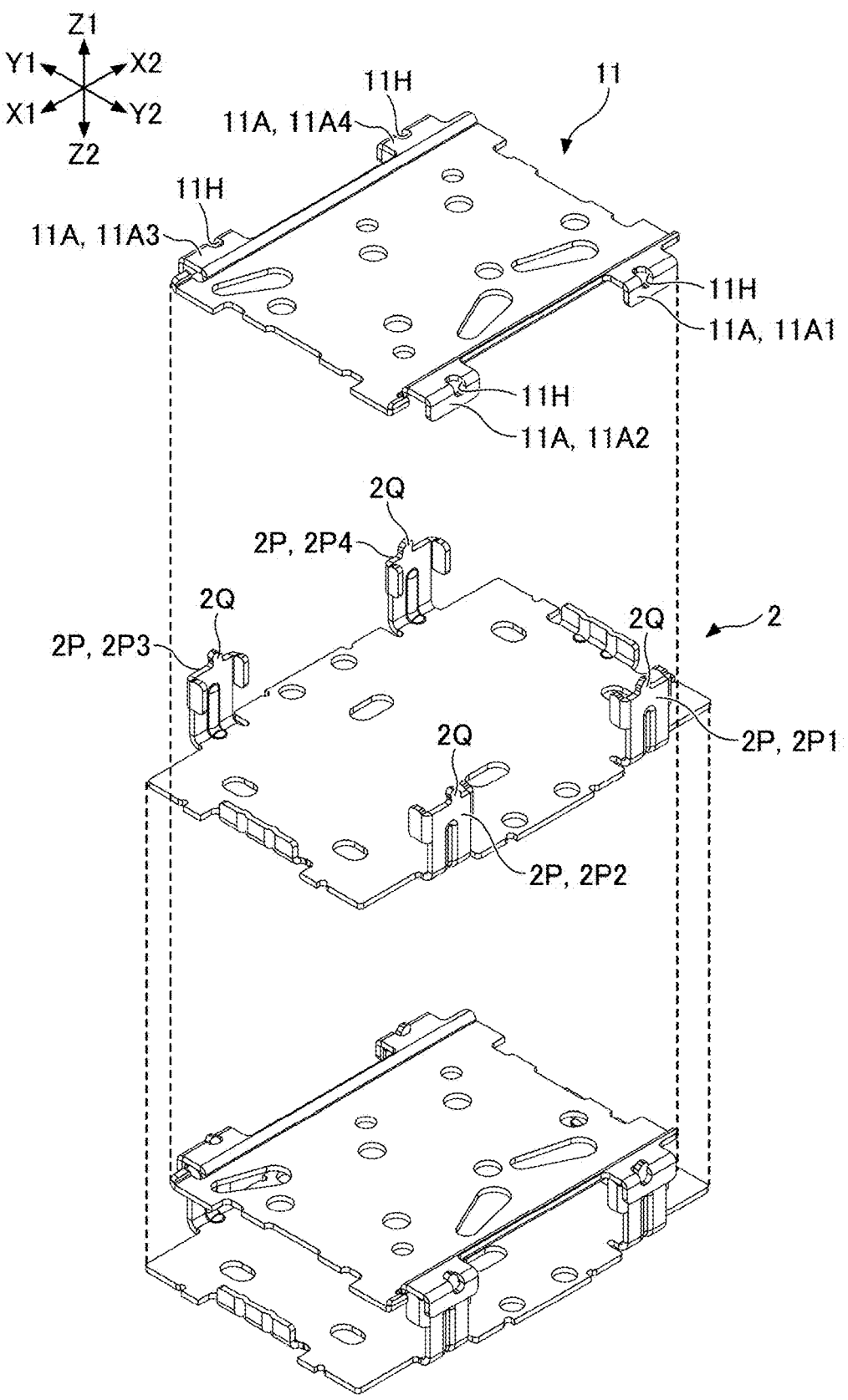
FIG. 9 is a perspective view of a base member and a bracket.

As illustrated in FIG. 9, the bracket 11 is attached to the base member 2 by engaging the attachment plate part 11A provided on the bracket 11 with the support part 2P provided on the base member 2. FIG. 9 is a diagram illustrating a configuration example of the base member 2 and the bracket 11. Specifically, the upper diagram of FIG. 9 is a perspective view of the bracket 11, the center diagram of FIG. 9 is a perspective view of the base member 2, and the lower diagram of FIG. 9 is a perspective view of the bracket 11 attached to the base member 2.

As illustrated in FIG. 9, the attachment plate part 11A includes a first attachment plate part 11A1 to a fourth attachment plate part 11A4. The support part 2P includes a first support part 2P1 to a fourth support part 2P4. The first attachment plate part 11A1 is engaged with the first support part 2P1, the second attachment plate part 11A2 is engaged with the second support part 2P2, the third attachment plate part 11A3 is engaged with the third support part 2P3, and the fourth attachment plate part 11A4 is engaged with the fourth support part 2P4. In the illustrated example, the attachment plate part 11A and the support part 2P are joined by welding. Specifically, through holes 11H are formed in each of the first attachment plate part 11A1 to the fourth attachment plate part 11A4, and a protruding part 2Q protruding upward is formed in each of the first support part 2P1 to the fourth support part 2P4. The joining (joining by laser welding) of the first attachment plate part 11A1 and the first support part 2P1 is implemented by irradiating the protruding part 2Q with a laser beam while the protruding part 2Q in the first support part 2P1 is inserted into the through hole 11H in the first attachment plate part 11A1. The same applies to the joining of the second attachment plate part 11A2 and the second support part 2P2, the joining of the third attachment plate part 11A3 and the third support part 2P3, and the joining of the fourth attachment plate part 11A4 and the fourth support part 2P4. However, the attachment plate part 11A and the support part 2P may be joined by a fastening member, an adhesive, caulking, or the like.

Figure 10:
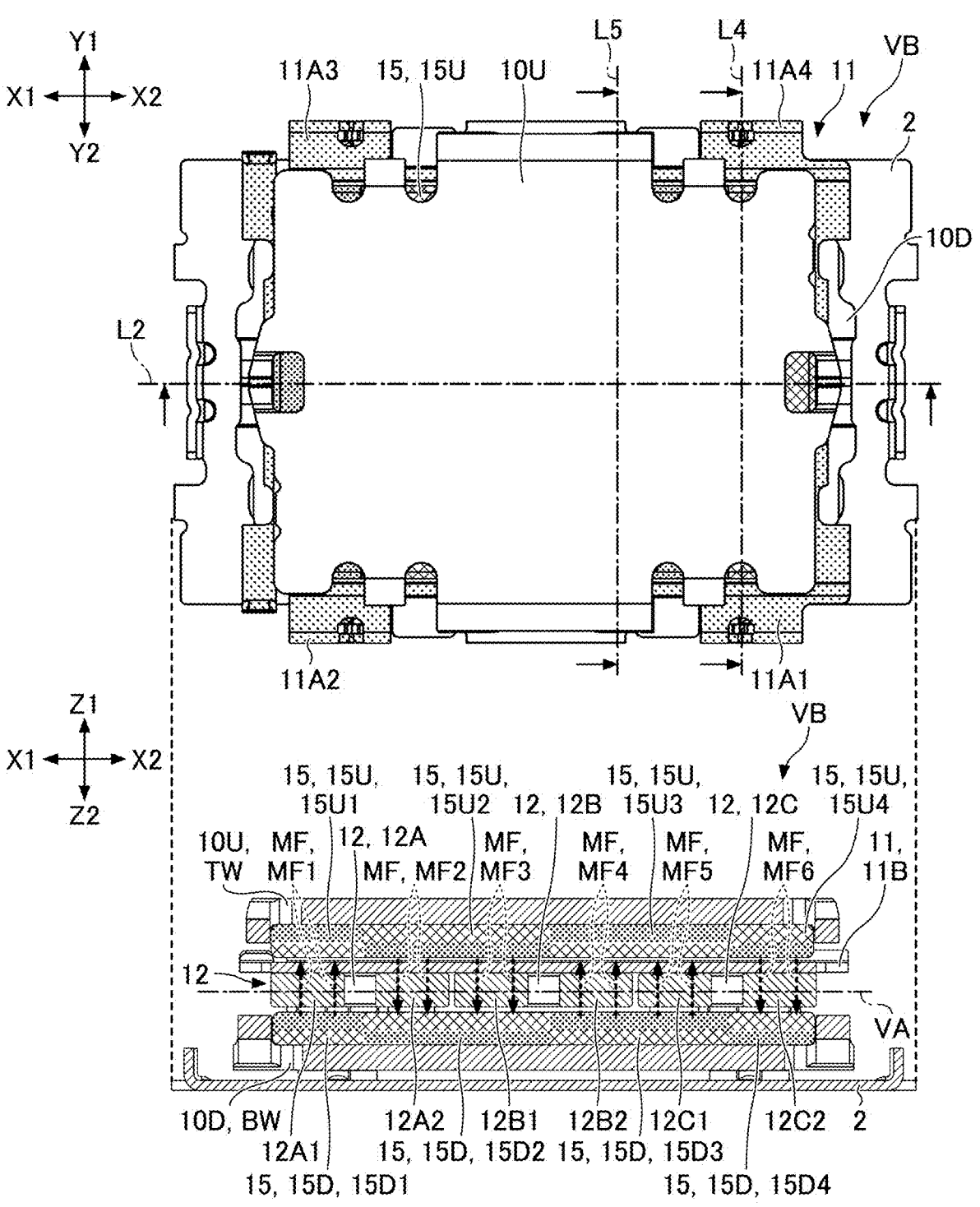
FIG. 10 is a top view and a cross-sectional view of a base member, a bracket, a coil, and a vibration body.

Next, the magnetic flux generated by the magnet 15 will be described with reference to FIG. 10. FIG. 10 is a diagram illustrating an example of the configuration of the base member 2, the bracket 11, the coil 12, and the vibration body VB. More specifically, the upper diagram of FIG. 10 is a top view of the base member 2, the bracket 11, and the vibration body VB. In the upper diagram of FIG. 10, a dot pattern is applied to the bracket 11 for clarity. The lower diagram of FIG. 10 is a cross-sectional view of the base member 2, the bracket 11, the coil 12, and the vibration body VB. More specifically, the lower diagram of FIG. 10 is a cross-sectional view of the base member 2, the bracket 11, the coil 12, and the vibration body VB in a virtual plane parallel to the XZ plane including the dash-dot line L2 in the upper diagram of FIG. 10, viewed from the Y2 side. More specifically, the lower diagram of FIG. 10 illustrates the vibration body VB composed of the upper yoke 10U, the upper magnet 15U, the lower magnet 15D, and the lower yoke 10D, and the coil 12 arranged in a space (a space sandwiched between the upper magnet 15U and the lower magnet 15D) surrounded by the upper yoke 10U and the lower yoke 10D. The magnet 15 generates a magnetic flux represented by a magnetic field line MF as indicated by a dotted line in the lower diagram of FIG. 10. In the example illustrated in the lower diagram of FIG. 10, the magnetic field line MF includes a first magnetic field line MF1 to a sixth magnetic field line MF6.

More specifically, when no current flows through the coil 12, the first magnetic field line MF1 exits from the N pole part of the first lower magnet part 15D1 of the lower magnet 15D, passes through the front main bundle wire part 12A1 of the first coil winding part 12A, and enters the S pole part of the first upper magnet part 15U1 of the upper magnet 15U. The second magnetic field line MF2 exits from the N pole part of the second upper magnet part 15U2 of the upper magnet 15U, passes through the rear main bundle wire part 12A2 of the first coil winding part 12A, and enters the S pole part of the second lower magnet part 15D2 of the lower magnet 15D. The third magnetic field line MF3 exits from the N pole part of the second upper magnet part 15U2 of the upper magnet 15U, passes through the front main bundle wire part 12B1 of the second coil winding part 12B, and enters the S pole part of the second lower magnet part 15D2 of the lower magnet 15D. The fourth magnetic field line MF4 exits from the N pole part of the third lower magnet part 15D3 of the lower magnet 15D, passes through the rear main bundle wire part 12B2 of the second coil winding part 12B, and enters the S pole part of the third upper magnet part 15U3 of the upper magnet 15U. The fifth magnetic field line MF5 exits from the N pole part of the third lower magnet part 15D3 of the lower magnet 15D, passes through the front main bundle wire part 12C1 of the third coil winding part 12C, and enters the S pole part of the third upper magnet part 15U3 of the upper magnet 15U. The sixth magnetic field line MF6 exits from the N pole part of the fourth upper magnet part 15U4 of the upper magnet 15U, passes through the rear main bundle wire part 12C2 of the third coil winding part 12C, and enters the S pole part of the fourth lower magnet part 15D4 of the lower magnet 15D.

Therefore, in the space surrounded by the upper yoke 10U and the lower yoke 10D, the magnetic field lines are concentrated in the partial space between the upper magnet 15U and the lower magnet 15D to increase the magnetic flux density, and the coil 12 is installed in this partial space. Therefore, in this configuration, by passing a current between the first end part 12S and the second end part 12E of the coil 12, the Lorentz force can be efficiently generated, and the vibration body VB can be efficiently vibrated along the X axis direction.

For example, when a current flows from the first end part 12S to the second end part 12E of the coil 12, the vibration body VB moves toward the X2 side (rear side). When a current flows from the second end part 12E to the first end part 12S of the coil 12, the vibration body VB moves toward the X1 side (front side). Therefore, the control unit CTR can cause the vibration body VB to vibrate along the vibration axis VA by passing a current so that the direction of the current flowing through the coil 12 is alternately reversed. The bracket 11 to which the coil 12 is attached is fixed to the base member 2 and not to the vibration body VB, and, therefore, the bracket 11 and the coil 12 do not vibrate together with the vibration body VB.

When the vibration body VB vibrates along the vibration axis VA, a magnetic flux (hereinafter referred to as "effective magnetic flux") extending in the Z axis direction generated between the upper magnet 15U and the lower magnet 15D included in the vibration body VB also vibrates along the vibration axis VA. That is, the effective magnetic flux crossing the bracket 11 as the conductive member between the upper magnet 15U and the lower magnet 15D vibrates along the vibration axis VA while maintaining the relationship across the bracket 11. Therefore, an eddy current flows through the body plate part 11B of the bracket 11. In the illustrated example, the upper magnet 15U, the lower magnet 15D, and the bracket 11 are arranged so that the effective magnetic flux and the body plate part 11B are perpendicular to each other.

The vibration body VB always receives a braking force, which is a force caused by the eddy current and acts in the direction opposite to the direction of vibration. Specifically, the vibration body VB receives a braking force acting to decelerate the vibration while being vibrated by the Lorentz force generated by the driving means DM. The braking force increases in proportion to the vibration speed of the vibration body VB. Therefore, the vibration acceleration at the natural frequency of the vibration body VB and frequency in the vicinity thereof is reduced by the braking force.

The braking force caused by the eddy current increases as the eddy current increases. The eddy current increases as the specific resistance of the conductive member (the bracket 11) decreases, increases as the conductivity of the conductive member (the bracket 11) increases, and increases as the thickness of the conductive member (the bracket 11) (thickness of the body plate part 11B) increases. Therefore, the material and thickness of the bracket 11 are selected so as to obtain a braking force of a desired magnitude. In the illustrated example, the bracket 11 is formed of tough pitch copper, which is the same material as the wire material of the coil 12, and has a thickness of about 0.3 mm.

With this configuration, the durability of the vibration generating device 101 can be improved as compared with the case where a viscoelastic member for generating a braking force is mounted between the vibration body VB and the non-vibration body NV. This is because while the viscoelastic member is susceptible to the ambient temperature, dimensional variations, deterioration, delamination, shredding, etc., the bracket 11 is less susceptible to such effects.

As illustrated in the upper diagram of FIG. 4, the bracket 11 is formed to have a plurality of openings (three first openings H1, three second openings H2, and six third openings H3). At least one of the plurality of openings may be a notch.

The first opening H1 is a non-circular (substantially teardrop-shaped) opening for preventing the upper surface of the coil 12 from tilting with respect to the lower surface of the body plate part 11B due to interference between the body plate part 11B and the conductive wire part CP when the coil 12 is attached to the lower surface of the body plate part 11B of the bracket 11.

The second opening H2 is a substantially circular opening for receiving a jig (not illustrated) used for positioning the air core part AC of the coil 12. The jig (not illustrated) is, for example, a cylindrical rod member. In the illustrated example, the first opening H1 also functions as an opening for receiving the jig.

The third opening H3 is a substantially circular opening formed for inserting a jig for maintaining an appropriate clearance between the bracket 11 and the coil 12 when an adhesive is supplied between the lower surface of the body plate part 11B of the bracket 11 and the upper surface of the coil 12.

In the illustrated example, the first opening H1 to the third opening H3 are all formed at positions avoiding the trajectory TR. The trajectory TR is a trajectory on the body plate part 11B through which the central axis of the effective magnetic flux passes when the vibration body VB vibrates. That is, the vibration generating device 101 is configured such that the central axis of the effective magnetic flux extending in the Z axis direction moves in the X axis direction along the linear trajectory TR. In the illustrated example, the central axis of the effective magnetic flux includes the central axis of the effective magnetic flux generated by the first lower magnet part 15D1, the second upper magnet part 15U2, the third lower magnet part 15D3, and the fourth upper magnet part 15U4, as illustrated by the magnetic field line MF in FIG. 10. The trajectory TR is located on the vibration axis VA in the top view. The central axis of the effective magnetic flux may be read as the respective coil axes of the first coil winding part 12A, the second coil winding part 12B, and the third coil winding part 12C.

That is, the first opening H1 to the third opening H3 are all formed at positions avoiding the central region CR. The central region CR is a region including the trajectory TR in the central part of the body plate part 11B. Specifically, the central region CR is a region through which an eddy current flows, the eddy current being generated by the effective magnetic flux generated by the magnet 15 and the conductive member (the bracket 11) arranged to cross the effective magnetic flux. In the upper diagram of FIG. 4, a dot pattern is applied to the central region CR for clarity.

In the illustrated example, openings such as the first opening H1 to the third opening H3 are not formed in the rectangular central region CR of the body plate part 11B, and, therefore, the vibration generating device 101 has an effect that eddy current flows more easily than when an opening is formed in the central region CR. Further, the rectangular central region CR of the body plate part 11B is flat and no recessed parts or protruding parts are formed in the central region CR, and, therefore, the vibration generating device 101 has an effect that eddy current flows more easily than when recessed parts or protruding parts are formed in the central region CR and the central region CR is not flat.

In the top view, the central region CR is laterally symmetrical with respect to the vibration axis VA and longitudinally symmetrical with respect to the line segment L1 (see the upper diagram of FIG. 4) representing the left-right axis passing through the center point of the bracket 11. This configuration has an effect that the magnitude of the braking force when the vibration body VB moves forward (in the direction X1) and the magnitude of the braking force when the vibration body VB moves backward (in the direction X2) are equal.

Figure 11:
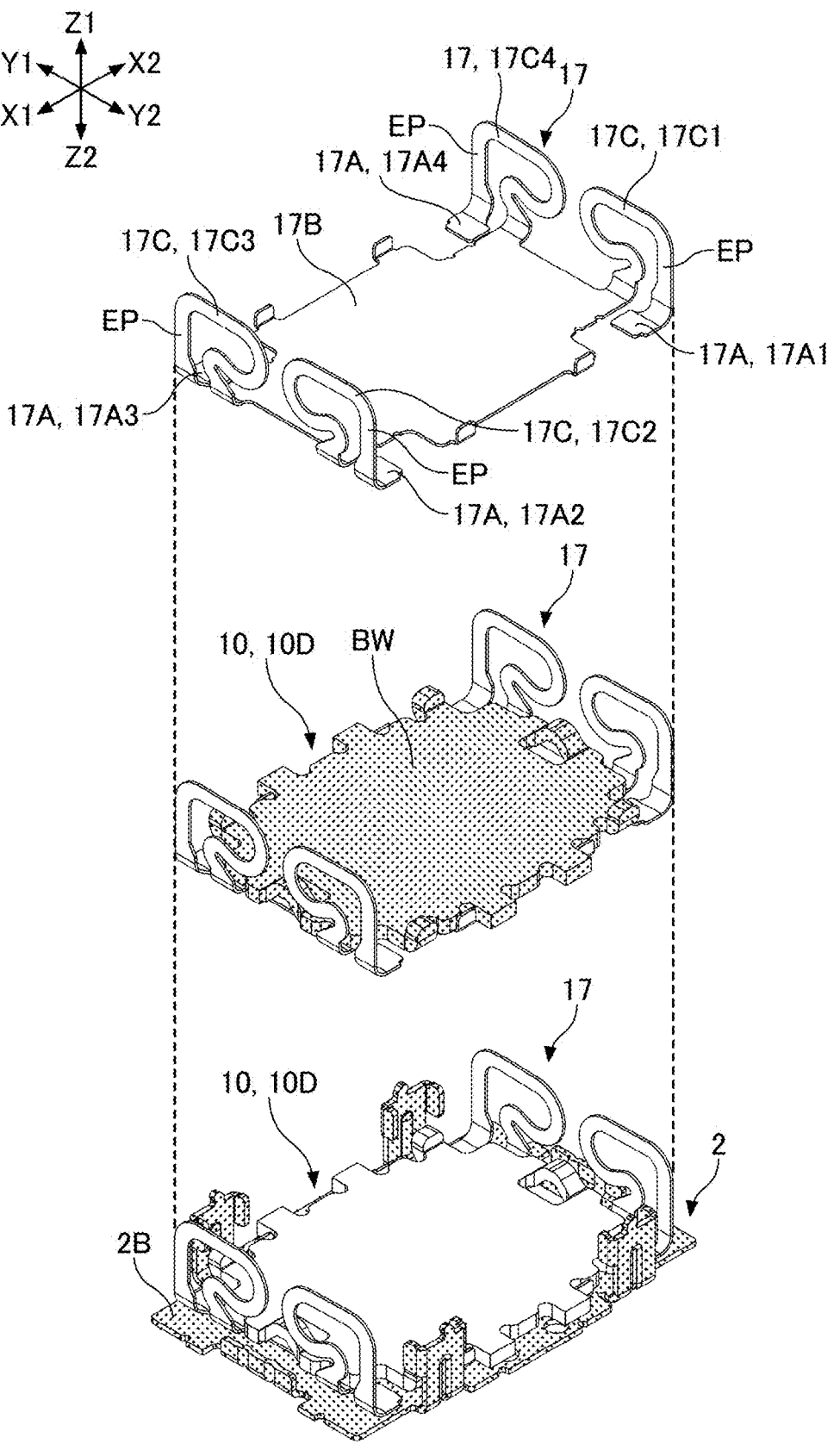
FIG. 11 is a perspective view of members constituting a vibration generating device.
Figure 12:
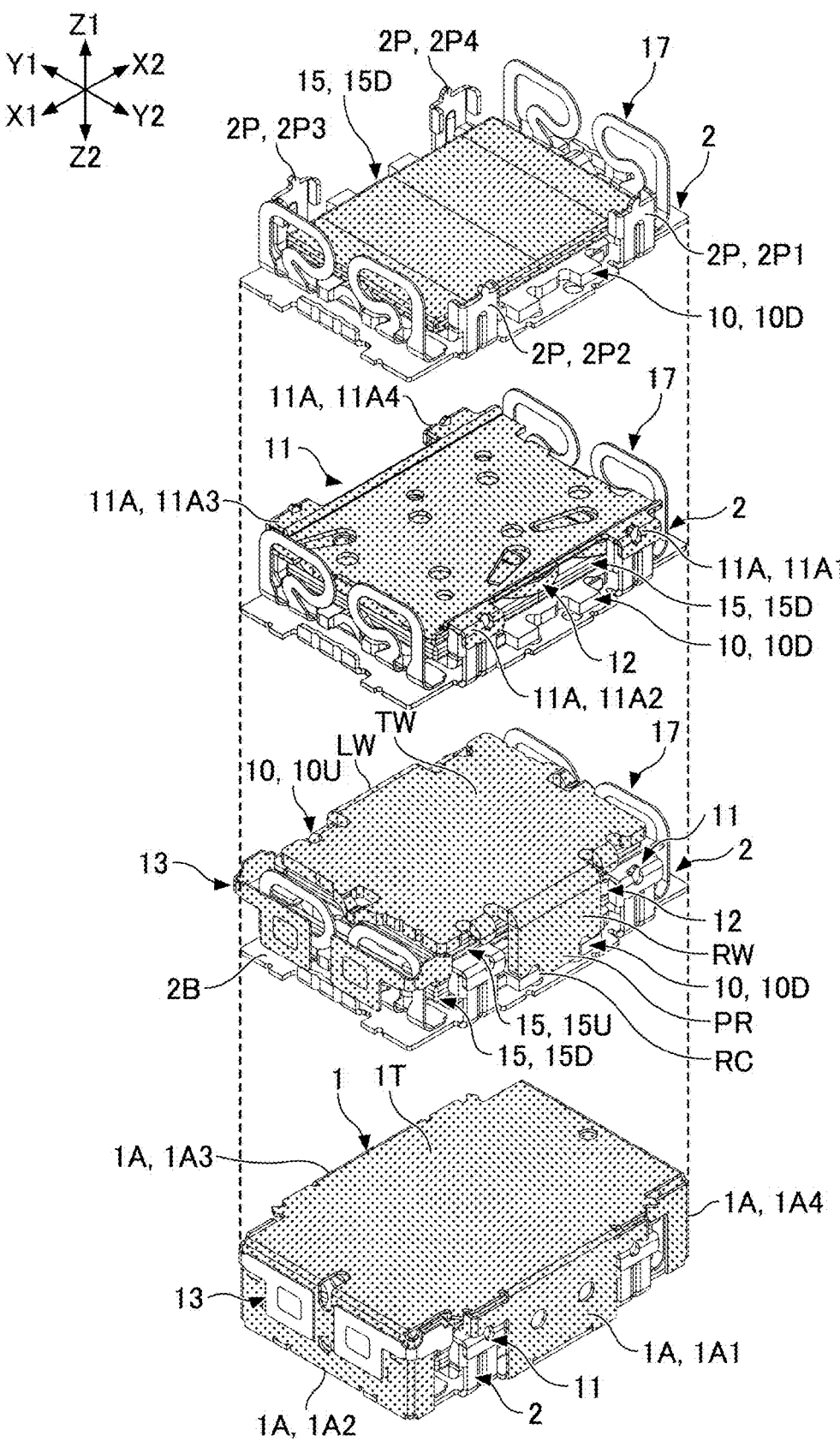
FIG. 12 is a perspective view of members constituting a vibration generating device.

Next, a method of assembling the vibration generating device 101 will be described with reference to FIGS. 11 and 12. FIGS. 11 and 12 are perspective views of each member constituting the vibration generating device 101. In FIGS. 11 and 12, dot patterns are applied to members to be newly attached for clarity.

Specifically, the upper diagram of FIG. 11 is a perspective view of the plate spring 17, the center view of FIG. 11 is a perspective view of the plate spring 17 to which the lower yoke 10D is attached, and the lower diagram of FIG. 11 is a perspective view of the base member 2 to which the plate spring 17 in a state illustrated in the center view of FIG. 11 is attached.

The uppermost diagram of FIG. 12 is a perspective view of the base member 2 further having the lower magnet 15D attached thereto, the second diagram from the top of FIG. 12 is a perspective view of the base member 2 further having the bracket 11 and the coil 12 attached thereto, the third diagram from the top of FIG. 12 is a perspective view of the base member 2 further having the upper magnet 15U, the upper yoke 10U and the wiring board 13 attached thereto, and the lowermost diagram of FIG. 12 is a perspective view of the base member 2 further having the cover member 1 attached thereto, i.e., a perspective view of the vibration generating device 101.

First, as illustrated in the central diagram of FIG. 11, the lower yoke 10D is superposed on the upper surface of the vibration body support part 17B of the plate spring 17. In the illustrated example, the bottom plate BW of the lower yoke 10D is superposed on the upper surface of the vibration body support part 17B without applying an adhesive. A vibrationdamping steel plate (not illustrated) as a reinforcing material for preventing the bending of the standing part EP may be attached to the outer surface of the standing part EP of the elastic arm part 17C of the plate spring 17.

Thereafter, the plate spring 17 on which the lower yoke 10D is superposed is installed on the upper surface of the bottom plate part 2B of the base member 2 as illustrated in the lower diagram of FIG. 11. The lower yoke 10D and the plate spring 17 are joined together, and the base member 2 and the plate spring 17 are joined together. In the illustrated example, the bottom plate part BW of the lower yoke 10D is joined to the upper surface of the vibration body support part 17B of the plate spring 17 by laser welding, and the connecting part 17A of the plate spring 17 is joined to the upper surface of the bottom plate part 2B of the base member 2 by laser welding.

Thereafter, the lower magnet 15D is superposed on the upper surface of the bottom plate part BW of the lower yoke 10D as illustrated in the uppermost diagram of FIG. 12. In the illustrated example, the lower yoke 10D and the lower magnet 15D are attracted to each other by magnetic force, and, therefore, joining by laser welding is not performed, and joining by an adhesive is not performed. However, the lower yoke 10D and the lower magnet 15D may be joined by laser welding or an adhesive.

Thereafter, as illustrated in the second diagram from the top in FIG. 12, the non-vibration body NV is attached to the base member 2. In the illustrated example, the non-vibration body NV is composed of the bracket 11, the coil 12, and the wiring board 13. The support part 2P of the base member 2 and the attachment plate part 11A of the bracket 11 are joined by a fastening member, caulking, laser welding, an adhesive, or the like. In the illustrated example, the support part 2P and the attachment plate part 11A are joined by an adhesive. Before the non-vibration body NV is attached to the base member 2, the coil 12 is joined to the bracket 11 by an adhesive, and the wiring board 13 is joined to the bracket 11 by a double-sided tape.

Thereafter, the upper yoke 10U to which the upper magnet 15U is attached is joined to the lower yoke 10D at a position where the upper yoke 10U does not contact the non-vibration body NV, as illustrated in the third diagram from the top in FIG. 12. Specifically, the upper yoke 10U and the lower yoke 10D are joined by welding or an adhesive at a part where the recessed part RC formed in the lower yoke 10D and the protruding part PR of the upper yoke 10U are engaged. In the illustrated example, the upper yoke 10U and the lower yoke 10D are joined by laser welding.

Before the upper yoke 10U is joined to the lower yoke 10D, the upper magnet 15U is superposed on the lower surface of the top plate TW of the upper yoke 10U in the same manner as when the lower magnet 15D is superposed on the upper surface of the bottom plate BW of the lower yoke 10D. The upper yoke 10U and the upper magnet 15U are attracted to each other by magnetic force, and, therefore, joining by laser welding is not performed and joining by an adhesive is not performed. However, the upper yoke 10U and the upper magnet 15U may be joined by laser welding or an adhesive.

Thereafter, as illustrated in the lowermost diagram of FIG. 12, the cover member 1 is attached so as to cover the members other than the base member 2 and the wiring board 13. In the illustrated example, the lower end part of the outer peripheral wall part 1A of the cover member 1 and the peripheral edge part of the bottom plate part 2B of the base member 2 are joined by laser welding. The cover member 1 and the base member 2 may be joined by a fastening member, an adhesive, caulking, or the like.

In this way, the vibration generating device 101 is assembled. The adhesive used in the assembling process described above may be any of thermosetting adhesives, light-curing adhesives, moisture-curing adhesives, and hybrid adhesives that are combinations thereof or the like. In the illustrated example, the adhesive is a thermosetting adhesive.

Figure 13:
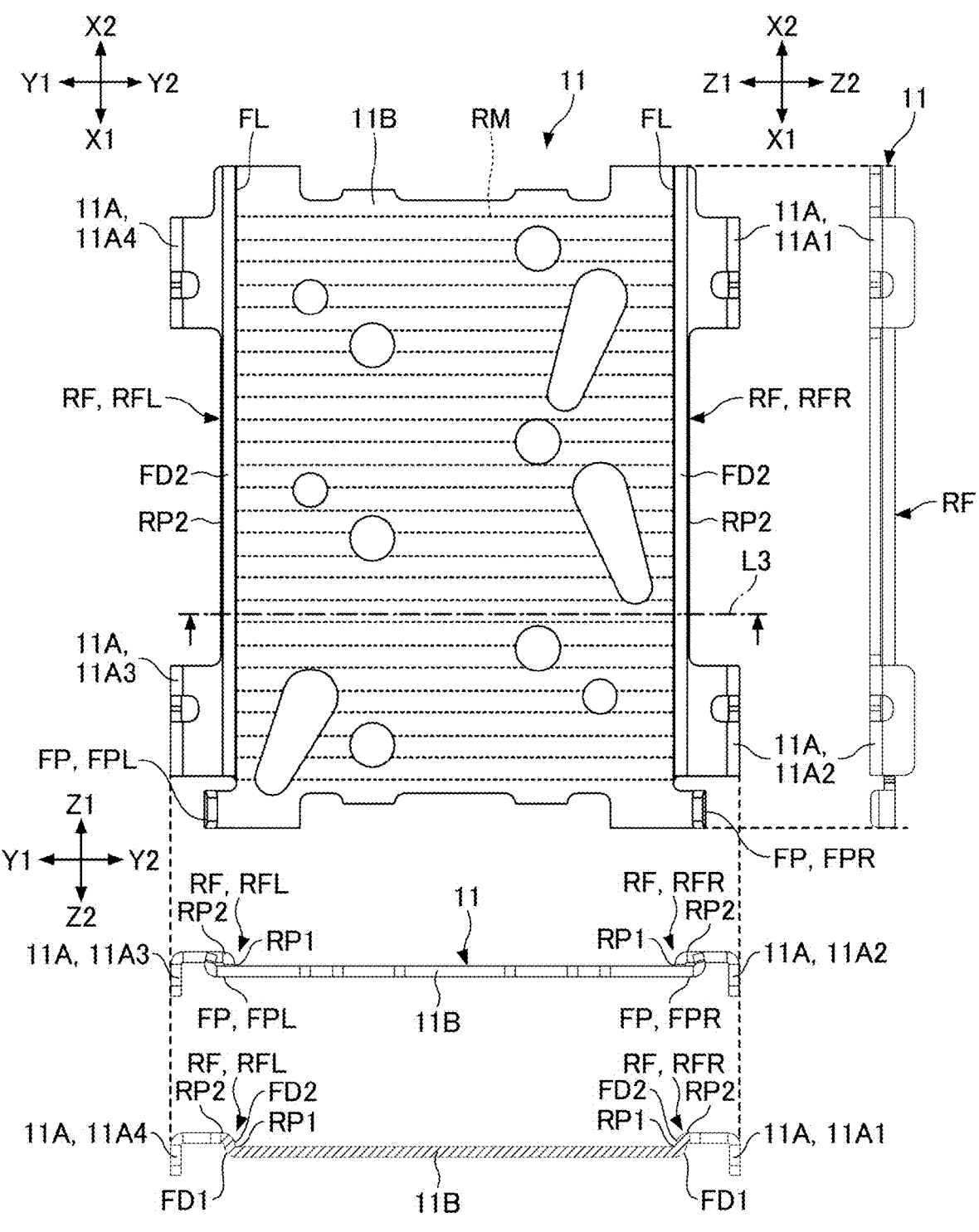
FIG. 13 illustrates a three-view diagram and a cross-sectional view of a bracket.

Next, the reinforcing structure of the bracket 11 will be described in detail with reference to FIG. 13. FIG. 13 includes a three-view diagram (top view, front view, and right side view) and a cross-sectional view of the bracket 11. Specifically, the lowermost diagram in FIG. 13 is a cross-section of the base member 2 in a virtual plane parallel to the YZ plane including the dash-dotted line L3 in the top diagram of FIG. 13, as viewed from the side X1.

In the illustrated example, the bracket 11 is formed of a rolled copper plate. Therefore, the bracket 11 has a rolling flaw (roll mark RM). A broken line on the upper surface of the body plate part 11B of the bracket 11 in FIG. 13 represents a roll mark RM.

Further, reinforcing parts RF are formed at the left and right ends of the body plate part 11B, respectively. In the illustrated example, the reinforcing part RF is a part subjected to so-called Z bending (step bending), and is configured such that the bending line FL on the lower side of the reinforcing part RF is perpendicular to the roll mark RM. Specifically, a left reinforcing part RFL is formed at the left end of the body plate part 11B, and a right reinforcing part RFR is formed at the right end of the body plate part 11B.

As illustrated in the cross-sectional view, the left reinforcing part RFL has a first bent part FD1 bent upward from the left end of the body plate part 11B, a first reinforcing plate part RP1 extending upward from the upper end of the first bent part FD1, a second bent part FD2 bent leftward from the upper end of the first reinforcing plate part RP1, and a second reinforcing plate part RP2 extending leftward from the left end of the second bent part FD2. The same applies to the right reinforcing part RFR.

The attachment plate part 11A extends outward from the outer end of the second reinforcing plate part RP2 as illustrated in FIG. 13. Specifically, the first attachment plate part 11A1 is formed so as to extend rightward from the right rear end of the second reinforcing plate part RP2 of the right reinforcing part RFR, and the second attachment plate part 11A2 is formed so as to extend rightward from the right front end of the second reinforcing plate part RP2 of the right reinforcing part RFR. Similarly, the third attachment plate part 11A3 is formed so as to extend leftward from the left front end of the second reinforcing plate part RP2 of the left reinforcing part RFL, and the fourth attachment plate part 11A4 is formed so as to extend leftward from the left rear end of the second reinforcing plate part RP2 of the left reinforcing part RFL.

Further, the bracket 11 is provided with a pedestal part FP on both sides of the front end part for mounting the inner conductor pattern PI of the wiring board 13 (see lower diagram of FIG. 4). Specifically, the bracket 11 includes a left pedestal part FPL for mounting the inner conductor pattern PI of the left wiring board 13L and a right pedestal part FPR for mounting the inner conductor pattern PI of the right wiring board 13R.

Figure 14:
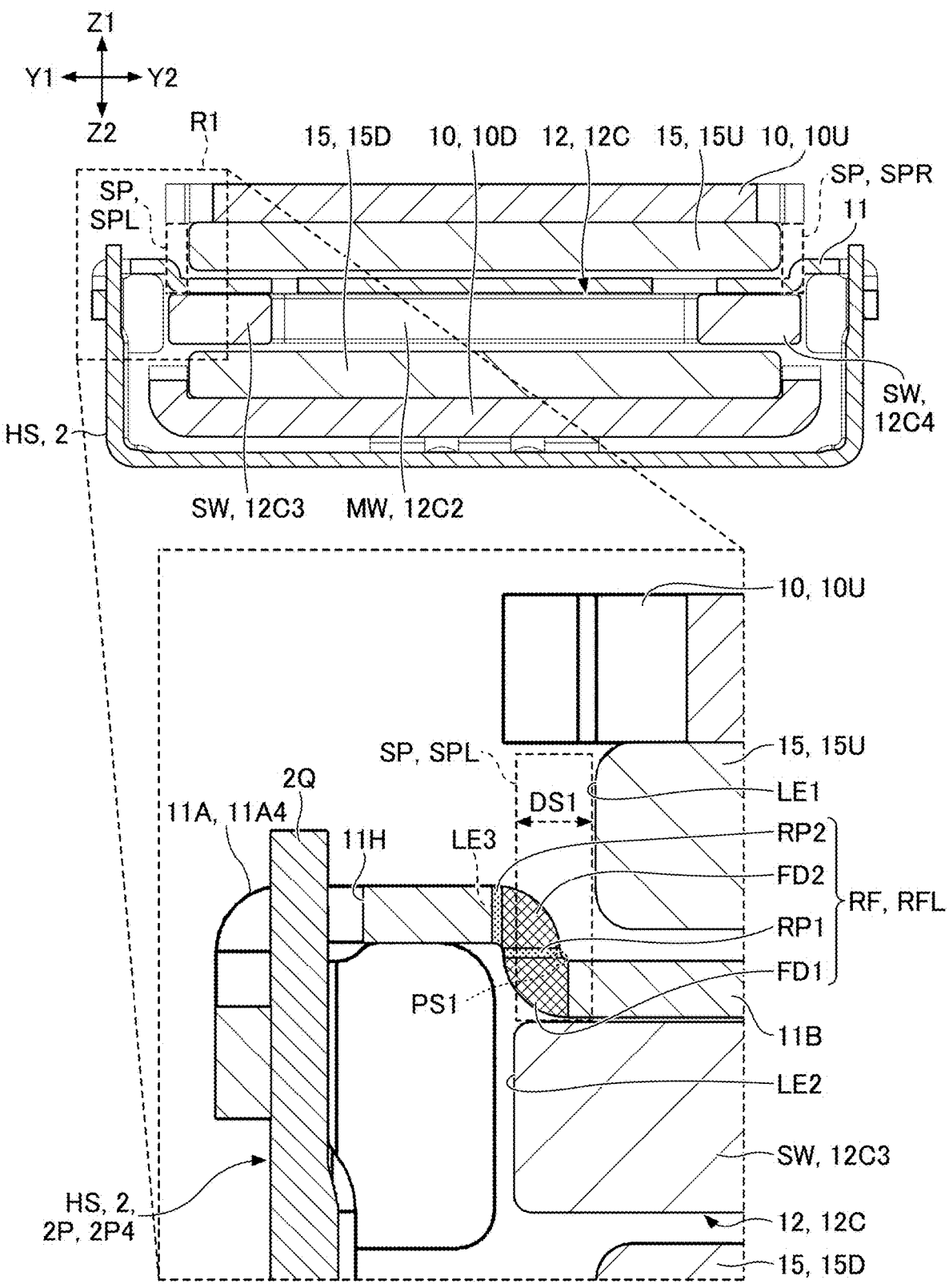
FIG. 14 is a cross-sectional view of the base member, the bracket, the coil, and the vibration body.

Next, the positional relationship of the base member 2, the yoke 10, the bracket 11, the coil 12, and the magnet 15 will be described with reference to FIG. 14. FIG. 14 is a cross-sectional view of the base member 2, the yoke 10, the bracket 11, the coil 12, and the magnet 15. Specifically, the upper diagram of FIG. 14 is a cross-sectional view of each member in a virtual plane parallel to the YZ plane including the dash-dot line L4 in the upper diagram of FIG. 10, as viewed from the X1 side. The lower diagram of FIG. 14 corresponds to an enlarged view of the area R2 surrounded by a broken line in the upper diagram of FIG. 14. In the lower diagram of FIG. 14, for the sake of clarity, a cross pattern is applied to the cross section of the first bent part FD1 and the second bent part FD2 constituting the left reinforcing part RFL, a dot pattern is applied to the cross section of the first reinforcing plate part RP1 and the second reinforcing plate part RP2 constituting the left reinforcing part RFL, and a diagonal line pattern representing the cross section of the metal member is applied to the other cross sections.

In the illustrated example, as illustrated in the lower diagram of FIG. 14, the reinforcing part RF is arranged such that at least a part thereof is positioned within the space SP. The space SP corresponds to a part not occupied by the upper magnet 15U in the space positioned above the coil 12. Specifically, the space SP corresponds to a part not occupied by the upper magnet 15U in the space positioned above the sub-bundle wire part SW of the coil 12. No permanent magnet is arranged in the space SP. This is because even if the permanent magnet is arranged, the permanent magnet cannot efficiently generate a driving force suitable for driving the vibration body VB. Therefore, the space SP is suitable as a place where at least a part of the reinforcing part RF is arranged without reducing the driving force by the driving means DM.

Specifically, the space SP includes a left space SPL for accommodating at least a part of the left reinforcing part RFL and a right space SPR for accommodating at least a part of the right reinforcing part RFR. As illustrated in the upper diagram of FIG. 14, the left space SPL includes a part of the space located above the left sub-bundle wire part 12C3 of the third coil winding part 12C which is not occupied by the upper magnet 15U, and the right space SPR includes a part of the space located above the right sub-bundle wire part 12C4 of the third coil winding part 12C which is not occupied by the upper magnet 15U.

With such a configuration, the reinforcing part RF is arranged in the space SP with almost no deviation from the outline of the coil 12 in the top view. Therefore, this configuration brings about the effect that the vibration generating device 101 is downsized without reducing the driving force.

Figure 15:
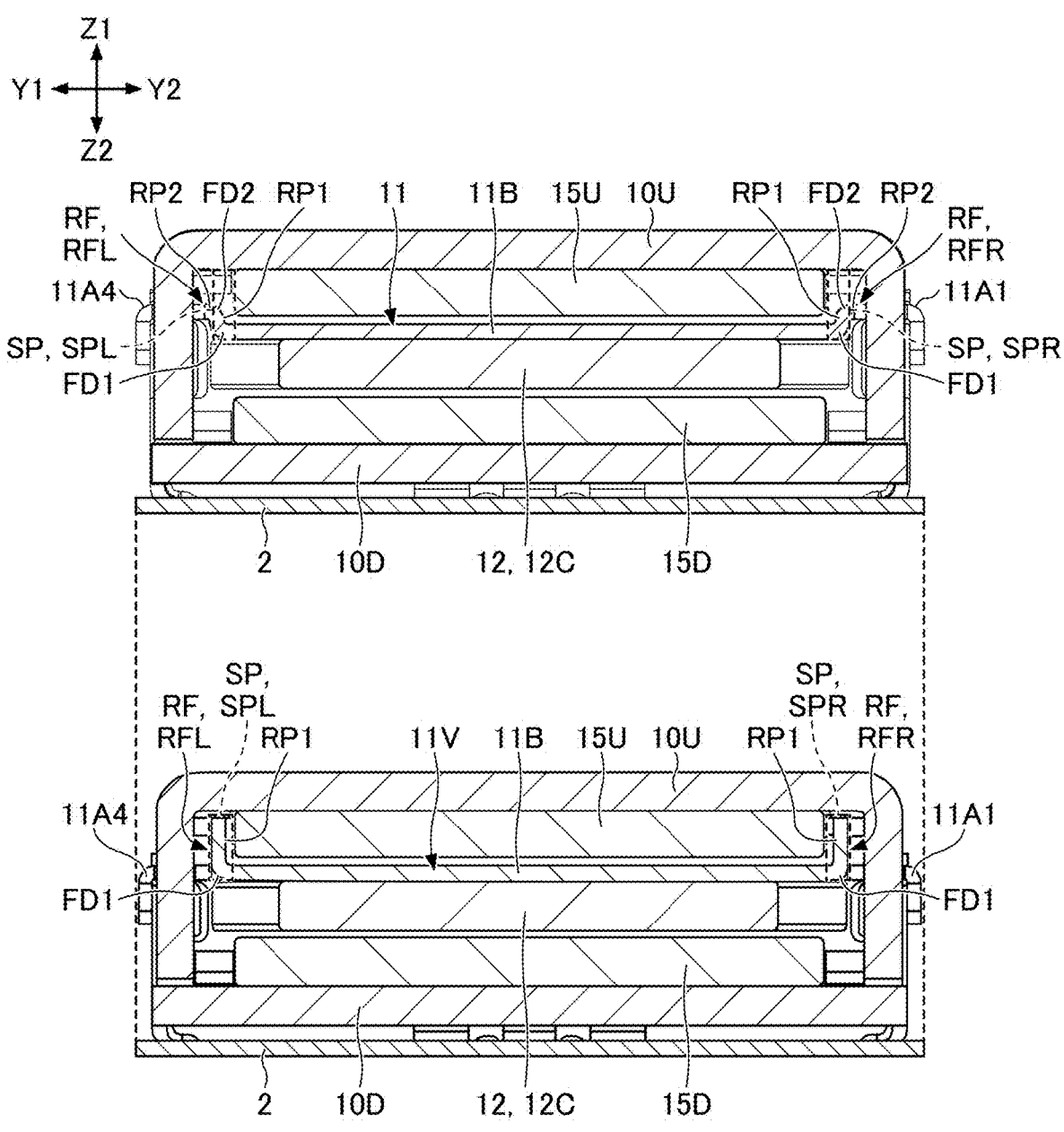
FIG. 15 is a cross-sectional view of the base member, the bracket, the coil, and the vibration body.

Next, with reference to FIG. 15, a bracket 11V as another example of the configuration of the bracket 11 will be described. FIG. 15 is a cross-sectional view of the base member 2, the yoke 10, the bracket 11 (the bracket 11V), the coil 12, and the magnet 15. Specifically, the upper diagram of FIG. 15 is a cross-sectional view of each member in a virtual plane parallel to the YZ plane including the dash-dot line L5 in the upper diagram of FIG. 10, as viewed from the side X1. The lower diagram of FIG. 15 is a cross-sectional view of the base member 2, the yoke 10, the bracket 11V, the coil 12, and the magnet 15, and corresponds to the upper diagram of FIG. 15. That is, the lower diagram of FIG. 15 corresponds to a diagram in which the bracket 11 in the upper diagram of FIG. 15 is replaced with the bracket 11V.

The bracket 11V differs from the bracket 11 having the reinforcing part RF extending over substantially the entire length of the body plate part 11B in the X axis direction in that the reinforcing part RF extends between the two attachment plate parts 11A at both ends (left end and right end) of the body plate part 11B in the Y axis direction. Specifically, in the bracket 11V, the right reinforcing part RFR is formed to extend between the first attachment plate part 11A1 and the second attachment plate part 11A2, and the left reinforcing part RFL is formed to extend between the third attachment plate part 11A3 and the fourth attachment plate part 11A4. That is, in the bracket 11V, no reinforcing part is formed at the left front end part, the left rear end part, the right front end part, or the right rear end part of the body plate part 11B. However, the bracket 11V may be formed such that the reinforcing part RF extends substantially over the entire length of the body plate part 11B in the X axis direction.

The bracket 11V differs from the bracket 11 in that the second bent part FD2 and the second reinforcing plate part RP2 are omitted, and the first reinforcing plate part RP1 extends upward close to the lower surface (ceiling surface) of the upper yoke 10U.

The bracket 11V differs from the bracket 11 in which the attachment plate part 11A extends outwardly from the second reinforcing plate part RP2 of the reinforcing part RF, in that the attachment plate part 11A extends outwardly from the body plate part 11B without involving the reinforcing part RF. That is, in the bracket 11V, the upper surface of the attachment plate part 11A and the upper surface of the body plate part 11B are substantially flush with each other.

Even when such a bracket 11V is provided instead of the bracket 11, the vibration generating device 101 can be downsized without lowering the driving force, similar to the case where the bracket 11 is provided. This is because at least a part of the left reinforcing part RFL is accommodated in the left space SPL, and at least a part of the right reinforcing part RFR is accommodated in the right space SPR. Further, the bracket 11V provides an effect that machining is easier than that of the bracket 11.

Figure 16:
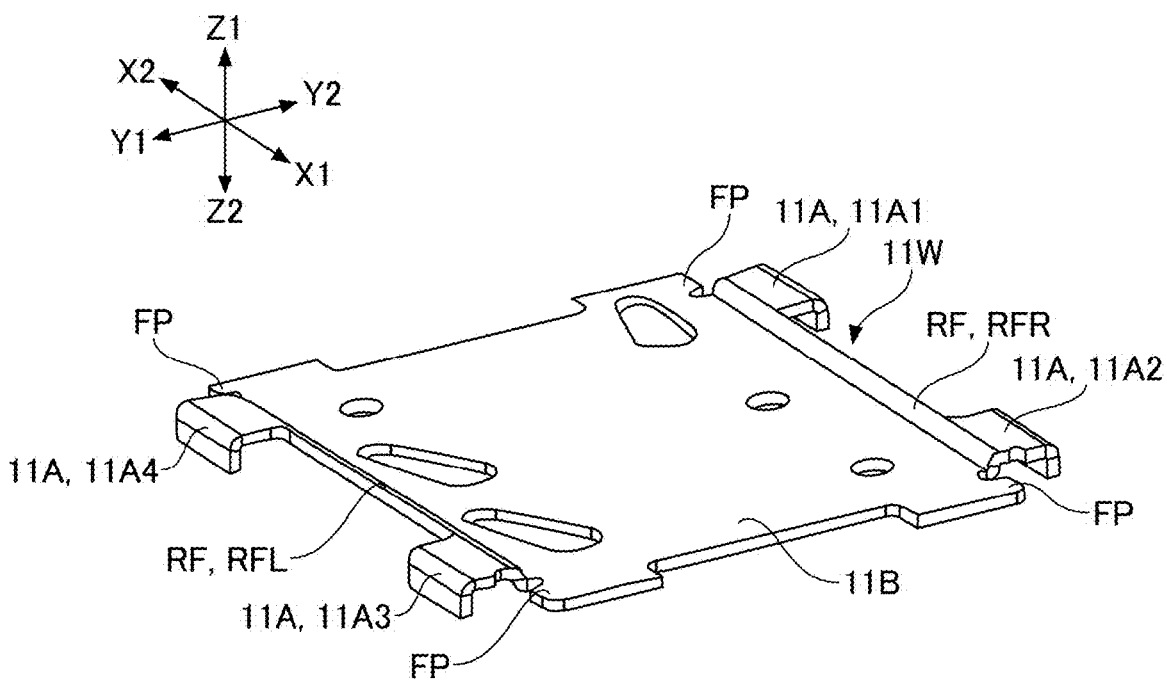
FIG. 16 is a perspective view of another example configuration of a bracket.

Next, with reference to FIG. 16, a bracket 11W as yet another configuration example of the bracket 11 will be described. FIG. 16 is a perspective view of the bracket 11W. The bracket 11W differs from the bracket 11 having two pedestal parts FP, in that the bracket 11W has four pedestal parts FP and the third opening H3 (see the upper diagram in FIG. 4) is omitted, but otherwise the bracket 11W is the same as the bracket 11.

More specifically, in the bracket 11W, the right reinforcing part RFR is formed to extend between the first attachment plate part 11A1 and the second attachment plate part 11A2, including parts where the first attachment plate part 11A1 and the second attachment plate part 11A2 are arranged. Similarly, the left reinforcing part RFL is formed to extend between the third attachment plate part 11A3 and the fourth attachment plate part 11A4, including parts where the third attachment plate part 11A3 and the fourth attachment plate part 11A4 are arranged. The reinforcing part RF of the bracket 11W includes a first bent part FD1, a first reinforcing plate part RP1, a second bent part FD2, and a second reinforcing plate part RP2, similar to the reinforcing part RF of the bracket 11 (see FIG. 14).

Even when the bracket 11W is provided instead of the bracket 11, the vibration generating device 101 can be downsized without lowering the driving force, similar to the case where the bracket 11 is provided. This is because at least a part of the left reinforcing part RFL is accommodated in the left space SPL, and at least a part of the right reinforcing part RFR is accommodated in the right space SPR.

Figure 17:
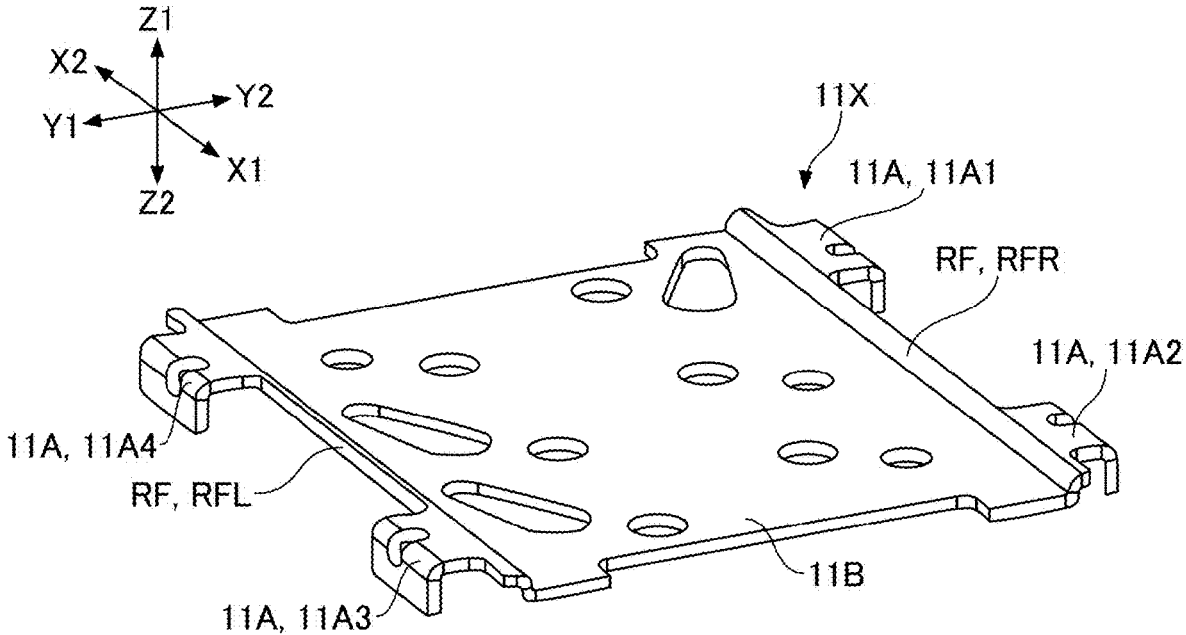
FIG. 17 is a perspective view of yet another example configuration of a bracket.

Next, with reference to FIG. 17, a bracket 11X as yet another configuration example of the bracket 11 will be described. FIG. 17 is a perspective view of the bracket 11X. The bracket 11X differs from the bracket 11 in that the bracket 11X has the reinforcing part RF (left reinforcing part RFL and right reinforcing part RFR) extending over the entire length in the X axis direction of both ends (left and right ends) of the body plate part 11B in the Y axis direction, but is the same as the bracket 11 in other respects. Specifically, the left reinforcing part RFL is formed so as to extend over the entire length of the left edge of the body plate part 11B in the X axis direction, and the right reinforcing part RFR is formed so as to extend over the entire length of the right edge of the body plate part 11B in the X axis direction. Each of the reinforcing parts RF of the bracket 11X includes a first bent part FD1, a first reinforcing plate part RP1, a second bent part FD2, and a second reinforcing plate part RP2, similar to the reinforcing part RF of the bracket 11 (see FIG. 14).

Even when the bracket 11X is provided instead of the bracket 11, the vibration generating device 101 can be downsized without reducing the driving force, similar to the case where the bracket 11 is provided. This is because at least a part of the left reinforcing part RFL is accommodated in the left space SPL, and at least a part of the right reinforcing part RFR is accommodated in the right space SPR.

As described above, as illustrated in FIGS. 1 to 3, the vibration generating device 101 according to an embodiment of the present disclosure includes a housing (HS), a movable body (vibration body (VB)) accommodated in the housing (HS), a support member (elastic support member (ES)) for supporting the movable body (vibration body (VB)) so as to be able to vibrate along a first direction (X axis direction), the coil 12 having a main bundle wire part (MW) extending along a second direction (Y axis direction) perpendicular to the first direction (X axis direction), and a magnetic flux generating member (the magnet 15) for generating a magnetic flux passing through the main bundle wire part (MW) along a third direction (Z axis direction) perpendicular to the first direction (X axis direction) and the second direction (Y axis direction), respectively. The vibration generating device 101 is configured such that the coil 12 is fixed to the housing HS and the magnetic flux generating member (the magnet 15) is fixed to the movable body (vibration body VB). The vibration generating device 101 is also provided with a conductive member (the bracket 11) which is fixed to the coil 12, extends in the first direction (X axis direction) so as to cross the magnetic flux, and is configured such that when the movable body (vibration body VB) moves in the first direction (X axis direction), an eddy current is generated to reduce the acceleration (vibrational acceleration) of the movable body (vibration body VB).

In this configuration, the magnetic generating member (the magnet 15) and the conductive member (the bracket 11) can generate a braking force (a force for preventing vibration) similar to a gel-like damper member for generating viscous resistance. In this configuration, resonance of the vibration body VB can be prevented by the braking force. In this configuration, the braking force is caused by an eddy current. Therefore, this configuration, which does not include a deformation part or a sliding part such as a gel-like damper member, has the effect that the durability of the vibration generating device 101 can be improved.

Further, in a typical vibration generating device, the braking force caused by the eddy current can be an undesirable force that reduces the vibration acceleration, but the vibration generating device 101 according to the present disclosure is configured to prevent the resonance of the vibration body VB by positively utilizing the braking force caused by the eddy current.

The conductive member (the bracket 11) may be formed of a nonmagnetic metal. This configuration has the effect that the magnetic force (attraction force) can be prevented from acting between the conductive member and the magnet 15 similar to the case where the conductive member (the bracket 11) is formed of a magnetic metal, and the efficient use of the driving force by the driving means DM can be prevented from being hindered by such attraction force.

The conductive member (the bracket 11) may also be formed of a material having a higher conductivity than iron or an iron alloy. This configuration has the effect that the braking force caused by the eddy current (the force for preventing vibration) can be increased. This is because the larger the conductivity, the greater the braking force caused by the eddy current. Therefore, this configuration has the effect that resonance of the heavier vibration body VB can be prevented, for example.

The conductive member (the bracket 11) may desirably be formed of copper, aluminum, or an alloy thereof. This configuration has the effect that material cost can be reduced as compared to the case where the conductive member is formed of a noble metal such as silver or an alloy thereof.

The conductive member (the bracket 11) may be provided between the magnetic flux generating member (the magnet 15) and the coil 12. This configuration has the effect that, because the conductive member (the bracket 11) can be installed at a position closer to the magnetic flux generating member (the magnet 15) than when the coil 12 is installed between the conductive member (the bracket 11) and the magnetic flux generating member (the magnet 15), braking force (force for preventing vibration) can be increased. This is because the magnetic flux density passing through the conductive member (the bracket 11) increases as the conductive member (the bracket 11) moves closer to the magnetic flux generating member (the magnet 15), and the braking force increases as the magnetic flux density passing through the conductive member (the bracket 11) increases.

The vibration generating device 101 may also be provided with a magnetic flux attracting member for attracting magnetic flux at a position separated from the magnetic flux generating member (the magnet 15) in the third direction (Z axis direction). In this case, the conductive member (the bracket 11) may be arranged between the magnetic flux generating member (the magnet 15) and the magnetic flux attracting member. In the illustrated example, the magnet 15 functions as a magnetic flux generating member and a magnetic flux attracting member, and the yoke 10 functions as a magnetic flux attracting member. Specifically, when the upper magnet 15U functions as a magnetic flux generating member, the lower yoke 10D and the lower magnet 15D function as magnetic flux attracting members. When the lower magnet 15D functions as a magnetic flux generating member, the upper yoke 10U and the upper magnet 15U function as magnetic flux attracting members. One of the upper magnet 15U and the lower magnet 15D may be omitted. When the upper magnet 15U is omitted, the lower magnet 15D functions as a magnetic flux generating member, and the upper yoke 10U functions as a magnetic flux attracting member. The same applies when the lower magnet 15D is omitted. According to this configuration, the angle (hereinafter referred to as "magnetic flux angle") formed between the extending direction (X axis direction or Y axis direction) of the conductive member (the bracket 11) and the direction (Z axis direction) of the magnetic flux from the magnetic flux generating member (the magnet 15) toward the magnetic flux attracting member is substantially a right angle. Thus, an effect that the braking force (the force for preventing vibration) can be increased can be attained, compared to the case where the magnetic flux angle is other than a right angle. This is because, when the magnetic flux density is the same, the braking force becomes larger as the magnetic flux angle becomes closer to the right angle.

For example, the magnetic flux generating member may be the upper magnet 15U as a first permanent magnet, and the magnetic flux attracting member may be the lower magnet 15D as a second permanent magnet. In this case, as illustrated in FIG. 7, the first permanent magnet (the upper magnet 15U) and the second permanent magnet (the lower magnet 15D) may be arranged such that the surfaces facing each other have polarities different from each other. The magnetic flux angle can be made closer to a right angle, and, therefore, this configuration has the effect that the braking force (the force for preventing vibration) can be further increased.

Further, as illustrated in FIG. 4, the vibration generating device 101 may be provided with the bracket 11 having the body plate part 11B extending along a plane parallel to each of the first direction (X axis direction) and the second direction (Y axis direction) and to which the coil 12 is attached, and the attachment plate part 11A extending from the body plate part 11B and fixed to the housing HS. In this case, the coil 12 may be fixed to the housing HS (the base member 2) via the bracket 11, and the magnetic flux generating member (the magnet 15) may be fixed to the movable body (vibration body VB). The body plate part 11B may be formed of copper, aluminum, or an alloy thereof, and may function as a conductive member. This configuration has the effect that the number of components can be reduced as compared with the case where a member other than the bracket 11 (the body plate part 11B) functions as a conductive member.

The conductive member (the bracket 11) may be configured so as not to have an opening at a position corresponding to the trajectory TR (see the upper diagram in FIG. 4) of the center of the magnetic flux when the movable body (vibration body VB) vibrates. That is, the conductive member (the bracket 11) may be configured to always intersect the magnetic flux at least in the central region CR when the movable body (vibration body VB) is vibrating. This configuration has the effect that eddy current flows more easily than when the conductive member has an opening that intersects the trajectory TR.

The coil 12 may also have an air core part AC that is the innermost part of the coil winding part and a conductive wire part CP that extends outward from the air core part AC. The conductive member (the bracket 11) may also have an opening (see first opening H1 in the upper diagram of FIG. 4) that prevents interference with the conductive wire part CP when the coil 12 is attached. In this case, the opening (first opening H1) may be formed at a position away from the trajectory TR. That is, the opening (first opening H1) may be formed at a position away from the central region CR. This configuration prevents interference between the conductive wire part CP and the conductive member (the bracket 11), and has the effect that eddy current flows more easily than when there is provided an opening (first opening H1) that intersects the trajectory TR.

The air core part AC may be formed in the shape of a long hole extending in the second direction (Y axis direction) as illustrated in the lower diagram of FIG. 4. In this case, as illustrated in the upper diagram of FIG. 4, the conductive wire part CP may be configured to extend outward from an end part of the air core part AC in the second direction (Y axis direction). In the example illustrated in the upper diagram of FIG. 4, the first conductive wire part CP1 is configured to extend forward (X1 direction) from the left end part (end part on the Y1 side) of the air core part AC. Compared with the case where the first conductive wire part CP1 is configured to extend outward from a part other than the end part of the air core part AC (for example, the center part), this configuration has the effect that an opening (first opening H1) can be formed at a position distant from the trajectory TR. The same applies to the second conductive wire part CP2 and the third conductive wire part CP3.

Further, as illustrated in FIGS. 1 to 3, the vibration generating device 101 according to an embodiment of the present disclosure includes a housing HS, a movable body (the vibration body VB) accommodated in the housing HS, a support member (the elastic support member ES, the plate spring 17) for supporting the movable body (the vibration body VB) so as to be capable of vibrating along a first direction (X axis direction, front-rear direction), a body plate part 11B extending in a second direction (Y axis direction, left-right direction) perpendicular to the first direction (X axis direction), and a reinforcing part RF (see FIG. 14) including a first reinforcing plate part RP1 (see FIG. 14) extending in a third direction (Z direction, up-down direction) perpendicular to the first direction (X axis direction) and the second direction (Y axis direction) via a first bent part FD1 (see FIG. 14) from one end (Y1 end, left end) of the body plate part 11B in the second direction (Y axis direction), wherein, the vibration generating device 101 is provided with a bracket 11 attached to a housing (the base member 2) via the attachment plate part 11A, the coil 12 having a main bundle wire part MW (see FIG. 4) including a plurality of conductive wires extending in a second direction (Y axis direction) and a sub-bundle wire part (SW) (see FIG. 4) connecting two adjacent main bundle wire parts MW and attached to one side (Z2 side, bottom) of a body plate part 11B in a third direction (Z axis direction), and a permanent magnet (the magnet 15) attached to a movable body (the yoke 10) on the other side (Z1 side, top) of the coil 12 in the third direction (Z axis direction) and generating a magnetic flux toward the main bundle wire part MW. As illustrated in FIG. 14, one end (left end LE1) of the permanent magnet (the magnet 15) in the second direction (Y axis direction) is located inside (Y2 side) relative to one end (left end LE2) of the sub-bundle wire part SW in the second direction (Y axis direction) by a distance DS1 (see also the center diagram in FIG. 7). The fact that the left end LE1 is located inside (Y2 side) relative to the left end LE2 means that the left end LE1 is located closer to the center point of the vibration body VB relative to the left end LE2. The first reinforcing plate part RP1 extends from a position (point PS1) that is inside (Y2 side) relative to one end (left end LE2) of the sub-bundle wire part SW in the second direction (Y axis direction) and that is outside relative to one end (left end LE1) of the permanent magnet (the magnet 15) in the second direction (Y axis direction), toward the other side (Z1 side, top) in the third direction (Z axis direction). The position outside the left end LE1 means a position farther from the center point of the vibration body VB relative to the left end LE1. In the illustrated example, the point PS1 corresponds to the position of the inner end and the lower end of the first reinforcing plate part RP1.

In this configuration, at least a part of the reinforcing part RF is provided in the space SP (see FIG. 14). Therefore, it is easier to achieve downsizing as compared with the configuration in which the reinforcing part is provided outside the coil. In the example illustrated in FIG. 14, the space SP corresponds to a part not occupied by the upper magnet 15U in the space located above the coil 12 (the space having the same cross section as the cross section of the coil 12 in the XY plane). More specifically, the space SP corresponds to a part not occupied by the upper magnet 15U in the space located above the sub-bundle wire part SW of the coil 12. No permanent magnet is arranged in this space SP. This is because even if a permanent magnet is arranged, the permanent magnet cannot efficiently generate a driving force suitable for driving the vibration body VB. Therefore, this space SP is suitable as a place where at least a part of the reinforcing part RF is arranged without reducing the driving force by the driving means DM.

Further, as illustrated in FIG. 14, the reinforcing part RF may include a second reinforcing plate part RP2 extended from the other end (Z1 end, top) of the first reinforcing plate part RP1 in the third direction (Z axis direction) toward the outside (Y1 side, left side) in the second direction (Y axis direction) via the second bent part FD2. That is, the reinforcing part RF may have a structure formed by so-called Z-bending.

This structure has the effect that the strength of the bracket 11 can be further increased as compared with the reinforcing part RF having a part not including the second reinforcing plate part RP2 as illustrated in the lower diagram of FIG. 15.

The attachment plate part 11A may extend outward (in the Y1 direction) from the outer end (left end LE3) of the second reinforcing plate part RP2 as illustrated in FIG. 14.

This configuration has the effect that the deformation of the body plate part 11B can be more reliably prevented as compared with the configuration in which the attachment plate part 11A extends from the body plate part 11B as illustrated in the lower diagram of FIG. 15.

Further, the bracket 11 may be formed of a metal plate having material marks such as roll marks RM as illustrated in FIG. 13. In this case, the reinforcing part RF may include a first bent part FD1 formed so that the bending line FL extends along a direction (X axis direction) intersecting the direction (Y axis direction) of the material marks (roll marks RM). That is, the reinforcing part RF may be configured such that the first bent part is not formed such that the bent line extends along a direction (Y axis direction) parallel to the direction (Y axis direction) of the material mark (roll mark RM). The bent line FL is a line formed by bending a metal plate to form the first bent part FD1.

This configuration brings about an effect that the bracket 11 can easily withstand loads from various directions.

The bracket 11 may also be formed of a metal (for example, copper, aluminum, silver, or alloys thereof) having a higher conductivity and a lower strength than the material constituting the housing HS (e.g., austenitic stainless steel). In this case, the bracket 11 may be configured to reduce the acceleration of the movable body (vibration body VB) by generating an eddy current so as to cancel a change in magnetic flux when the permanent magnet (the magnet 15) attached to the movable body (yoke 10) moves in the first direction (X axis direction).

This configuration brings about an effect that the bracket 11 can be formed of a material that easily generates an eddy current.

The preferred embodiments of the present invention have been described in detail above. However, the present invention is not limited to the embodiments described above. Various modifications, substitutions, and the like may be applied to the embodiments described above without departing from the scope of the present invention. Also, each of the features described with reference to the embodiments described above may be suitably combined so long as there is no technical conflict.

For example, in the embodiments described above, the vibration generating device 101 is configured to include a magnet 15 magnetized with eight poles and the coil 12 having three coil winding parts (six bundle wire parts), but may be configured to include the magnet 15 magnetized with a number of magnetic poles other than eight poles, such as two poles, four poles, six poles, ten poles, or twelve poles, and the coil 12 having a corresponding number of bundle wire parts. That is, the coil 12 may be configured to have one, two, or four or more coil winding parts.

Also, in the embodiments described above, the bracket 11 may have a right reinforcing part RFR and a left reinforcing part RFL, but one of the right reinforcing part RFR and the left reinforcing part RFL may be omitted. Alternatively, the bracket 11 may have a front reinforcing part formed at the front end of the body plate part 11B, or may have a rear reinforcing part formed at the rear end of the body plate part 11B. In this case, at least one of the right reinforcing part RFR, the left reinforcing part RFL, the front reinforcing part, and the rear reinforcing part may be omitted.

In the above-described embodiment, the left reinforcing part RFL is formed so as to extend substantially over the entire length of the left edge of the body plate part 11B in the X axis direction, but may be formed so as to extend along a part of the left edge of the body plate part 11B. The left reinforcing part RFL may be formed so as to extend along a plurality of parts of the left edge of the body plate part 11B. The same applies to the right reinforcing part RFR, the front reinforcing part, and the rear reinforcing part.

According to an aspect of the present invention, the vibration generating device can be easily downsized.

What is claimed is:

1. A vibration generating device comprising:
a housing;
a movable body accommodated in the housing;
a support member configured to support the movable body so as to be able to vibrate along a first direction;
a bracket including a body plate part extending in a second direction perpendicular to the first direction and a reinforcing part including a first reinforcing plate part extending in a third direction perpendicular to the first direction and the second direction via a first bent part from one end of the body plate part in the second direction, the bracket being attached to the housing via an attachment plate part;

a coil including a main bundle wire part including a plurality of conductive wires extending in the second direction and a sub-bundle wire part connecting two of the main bundle wire parts that are adjacent to each other, the coil being attached to one side of the body plate part in the third direction; and
a permanent magnet configured to generate a magnetic flux directed toward the main bundle wire part, the permanent magnet being attached to the movable body on another side of the coil in the third direction, wherein
one end of the permanent magnet in the second direction is positioned inside relative to one end of the sub-bundle wire part in the second direction, and
the first reinforcing plate part extends from a position that is inside relative to one end of the sub-bundle wire part in the second direction and outside relative to one end of the permanent magnet in the second direction, toward another side in the third direction.

2. The vibration generating device according to claim 1, wherein the reinforcing part includes a second reinforcing plate part extending from another end of the first reinforcing plate part in the third direction to outside in the second direction via the second bent part.

3. The vibration generating device according to claim 2, wherein the attachment plate part extends outward from an outer end of the second reinforcing plate part.

4. The vibration generating device according to claim 1, wherein
the bracket is formed of a metal plate including a material mark,
the reinforcing part includes the first bent part formed such that a bent line extends along a direction intersecting a direction of the material mark, and
the first bent part is not formed such that the bent line extends in a direction parallel to the direction of the material mark.

5. The vibration generating device according to claim 1, wherein the bracket is formed of a metal having a higher conductivity and a lower strength than a material forming the housing, the bracket being configured to reduce an acceleration of the movable body by generating an eddy current so as to cancel a change in the magnetic flux when the permanent magnet attached to the movable body moves along the first direction.

6. The vibration generating device according to claim 5, wherein
the housing is formed of stainless steel, and
the bracket is formed of copper or a copper alloy.

* * * * *